United States Patent [19]
Smiroldo

[11] Patent Number: 5,654,968
[45] Date of Patent: Aug. 5, 1997

[54] METHOD AND APPARATUS FOR MANAGING A NUMBER OF TIME SLOTS DURING WHICH PLURAL BIDDING DEVICES CAN REQUEST COMMUNICATION ACCESS TO A CENTRAL DEVICE

[75] Inventor: Michael Smiroldo, Belmont, Calif.

[73] Assignee: Multipoint Networks, Belmont, Calif.

[21] Appl. No.: 569,689

[22] Filed: Dec. 8, 1995

[51] Int. Cl.$^6$ .................................. H04J 3/14; H04J 3/16
[52] U.S. Cl. ........................... 370/443; 370/462; 370/468
[58] Field of Search ................................. 370/95.1, 95.2, 370/95.3, 79, 80, 81, 82, 83, 85.3, 85.2, 13, 17, 431, 432, 437, 442, 443, 444, 445, 447, 449, 458, 461, 498, 503, 462, 465, 468, 470, 310, 345, 347, 348, 349

[56] References Cited

U.S. PATENT DOCUMENTS 5,303,234  4/1994  Kou ........................................ 370/95.3
5,384,777  1/1995  Ahmadi et al. ........................ 370/85.2

*Primary Examiner*—Wellington Chin
*Assistant Examiner*—Huy D. Vu
*Attorney, Agent, or Firm*— Burns, Doane, Swecker & Mathis, LLP

[57] ABSTRACT

The present invention is directed to maximizing efficiency, or throughput, in a communications network where plural bidding devices arbitrate for access to a central device, while fairness in the bid arbitration process is maintained. Such enhanced operation is achieved by providing at least one central device, such as a hub, with an ability to receive bid indices representing bid success rates from each of a plurality of secondary devices. The plurality of secondary devices can be remote units referred to herein as launch pads. The bid indices represent the ability of each launch pad to successfully arbitrate for access to the hub. The hub collects the bid indices from all of the active launch pads and evaluates (for example, averages) them over a reasonable period of time to create a hub goal index. The hub goal index is then broadcast back to all of the launch pads so that each of the launch pads can evaluate its own bid index relative to the hub goal index, and then use this comparative information to modify its frequency of bidding for future access to the hub. As a result, launch pads tend to spread out into different bidding groups, each bidding group having a unique bid-to-data-transfer cycle time. At the same time the hub creates the hub goal index, the hub also creates a group bid index for each launch pad bidding group. The hub continually monitors a worst group bid index and uses it to modify a number of available time slots during which the launch pads can bid for access to the hub.

17 Claims, 11 Drawing Sheets

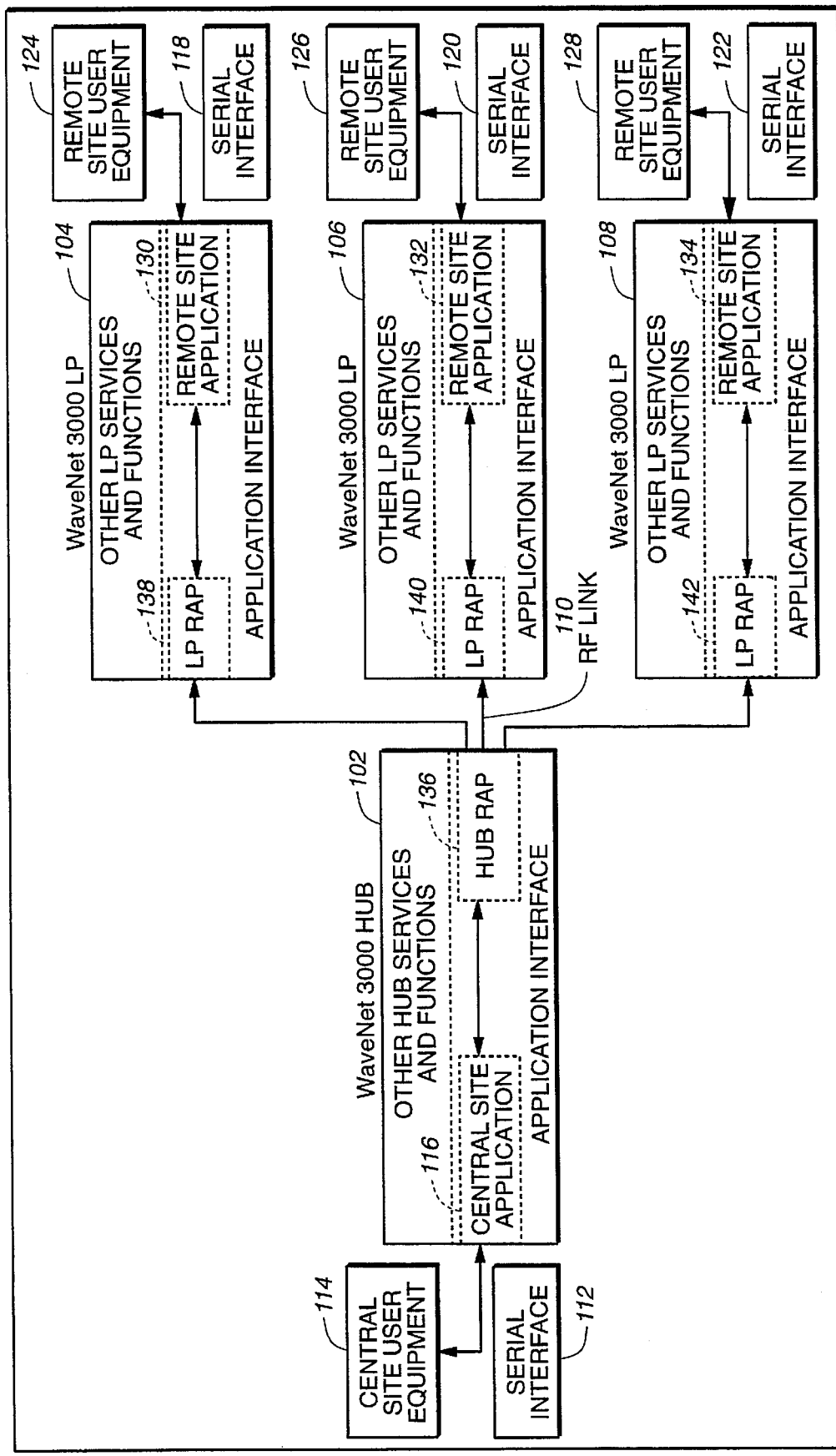
FIG._1

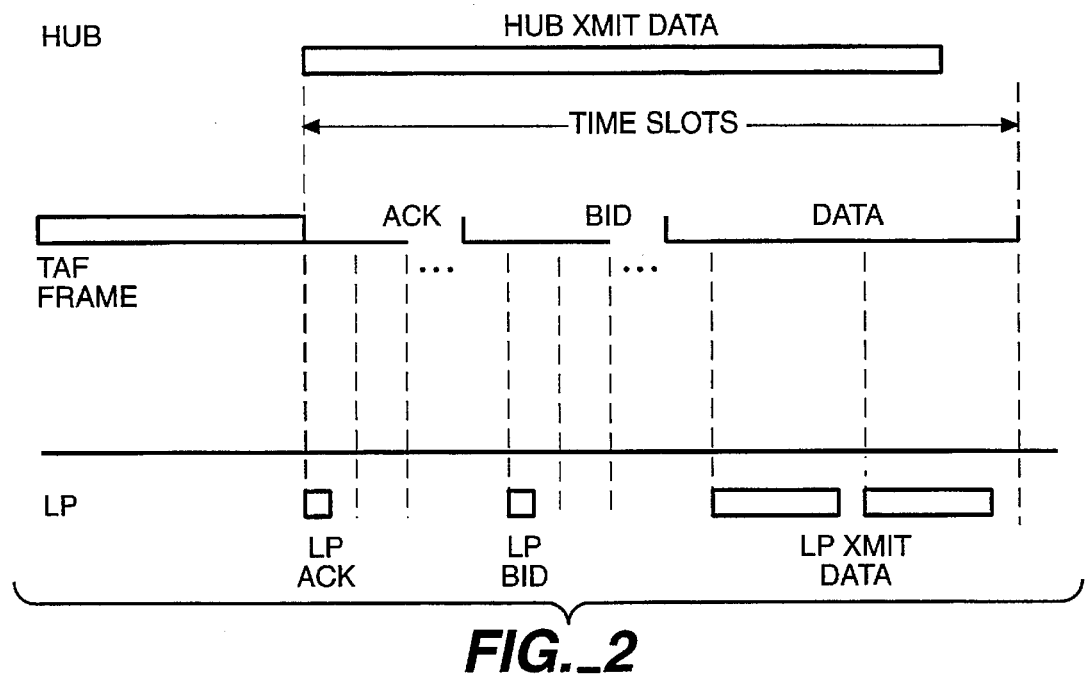
FIG._2
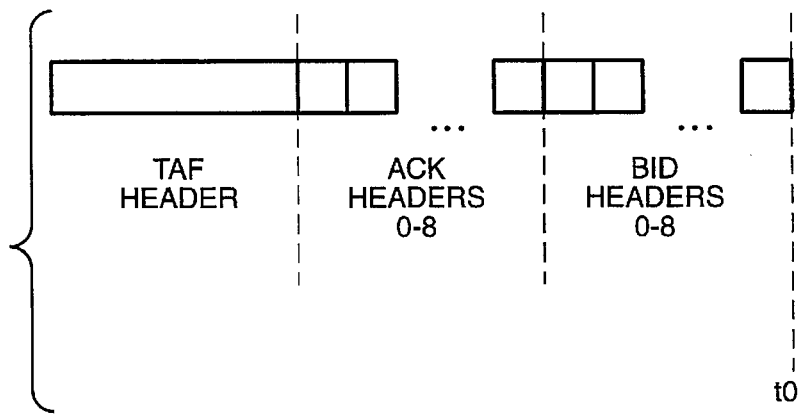
FIG._3A
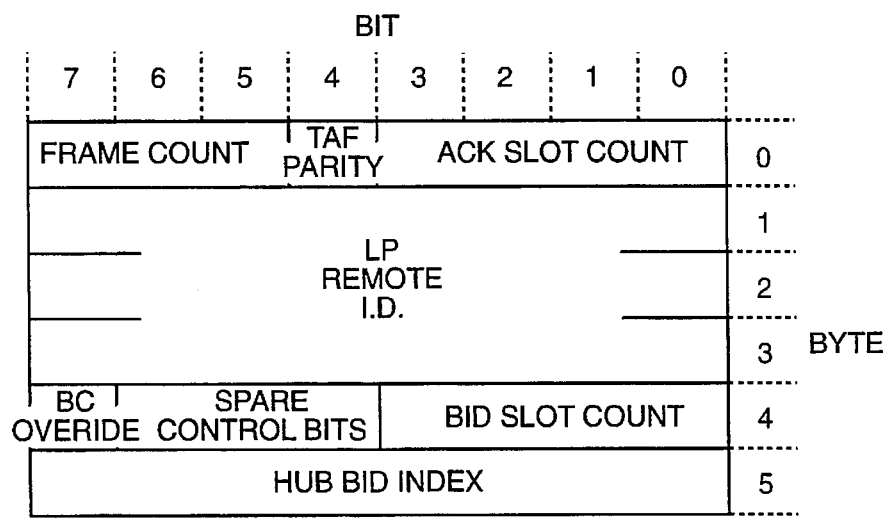
FIG._3B

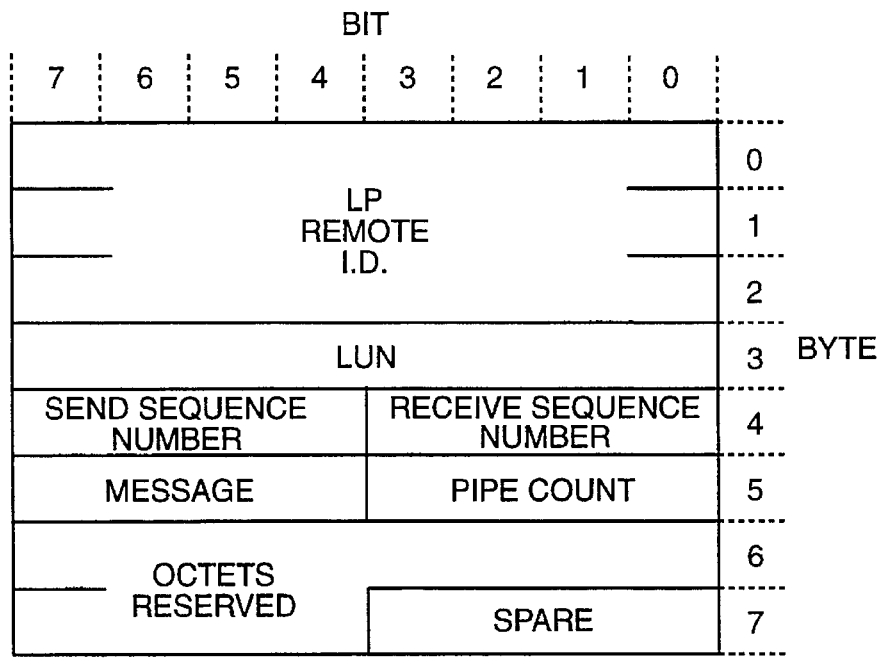
FIG._3C
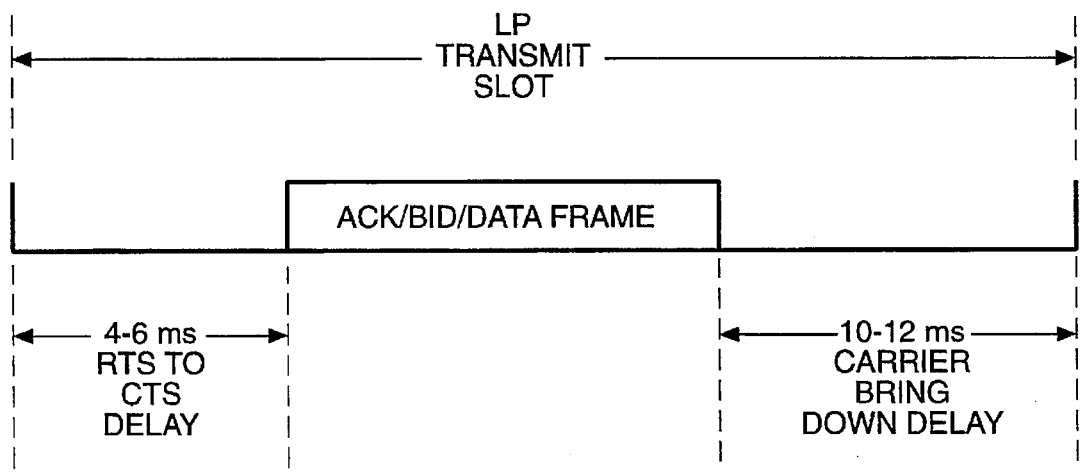
FIG._4A

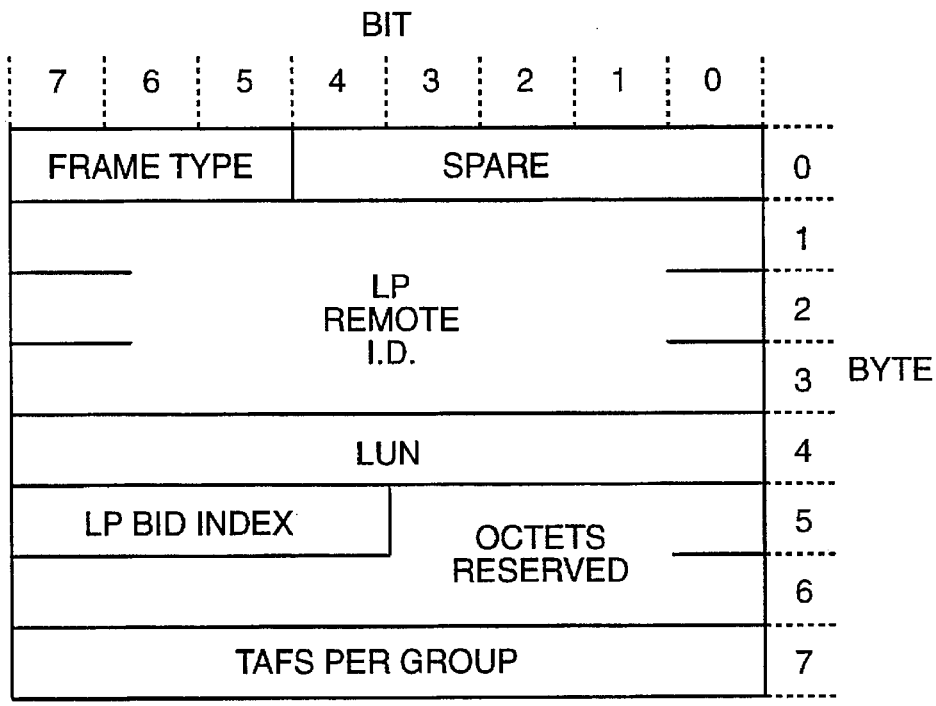
*FIG._4B*
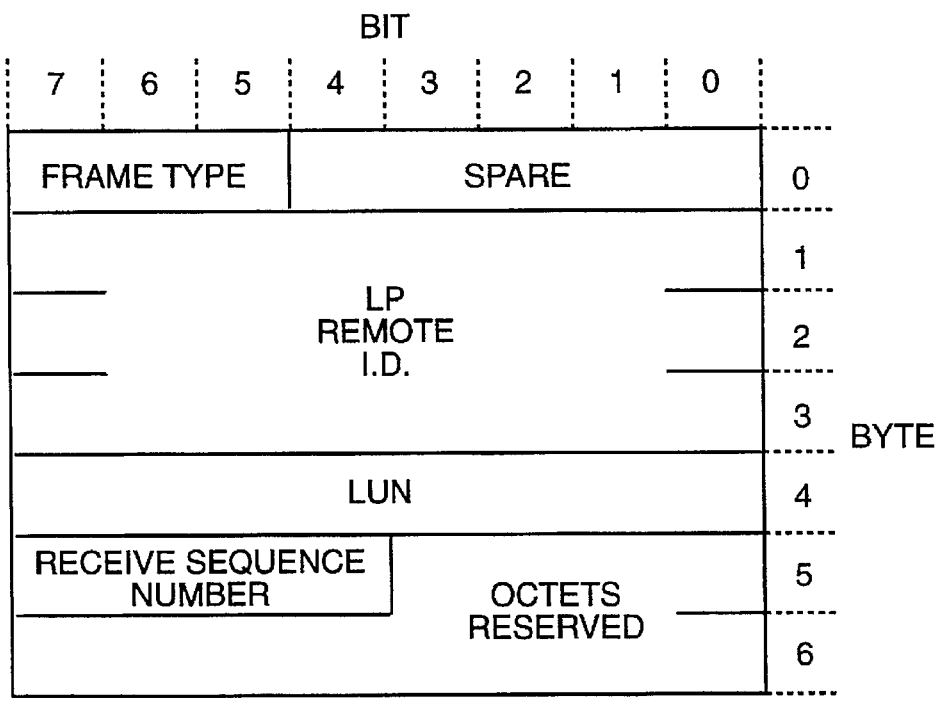
*FIG._4C*

FIG._5A

| BIT | | | | | | | | Byte |
|---|---|---|---|---|---|---|---|---|
| 7 | 6 | 5 | 4 | 3 | 2 | 1 | 0 | |
| FRAME TYPE | | | SPARE | MESSAGE | | | | 0 |
| LP REMOTE I.D. | | | | | | | | 1-3 |
| LUN | | | | | | | | 4 |
| ACK SLOT | | | | SEND SEQUENCE NUMBER | | | | 5 |

FIG._5B

| BIT | | | | | | | | Byte |
|---|---|---|---|---|---|---|---|---|
| 7 | 6 | 5 | 4 | 3 | 2 | 1 | 0 | |
| FRAME TYPE | | | SPARE | MESSAGE | | | | 0 |
| LP REMOTE I.D. | | | | | | | | 1-3 |
| LUN | | | | | | | | 4 |
| SEND SEQUENCE NUMBER | | | | OCTETS REQUESTED | | | | 5-6 |
| RETRANSMITS | | | | SPARE | | | | 7 |

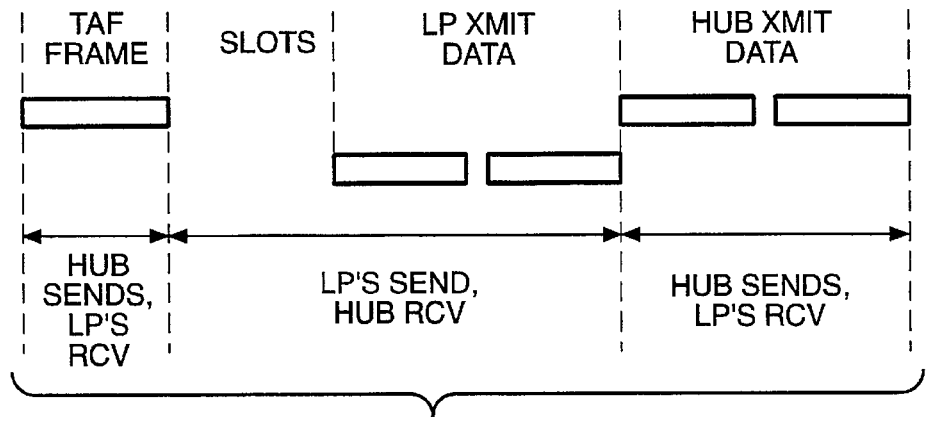
FIG._6A
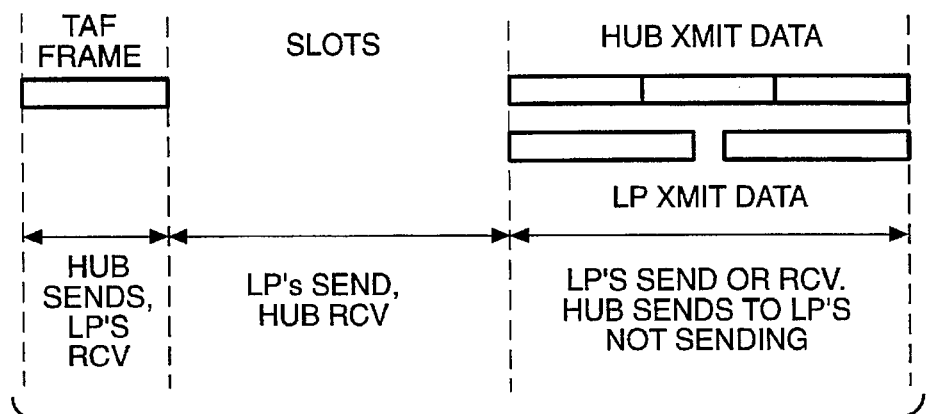
FIG._6B
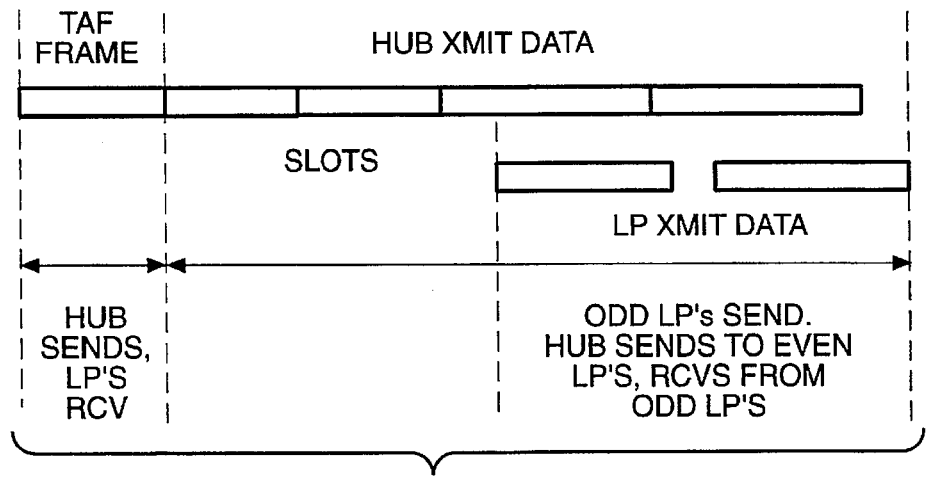
FIG._6C

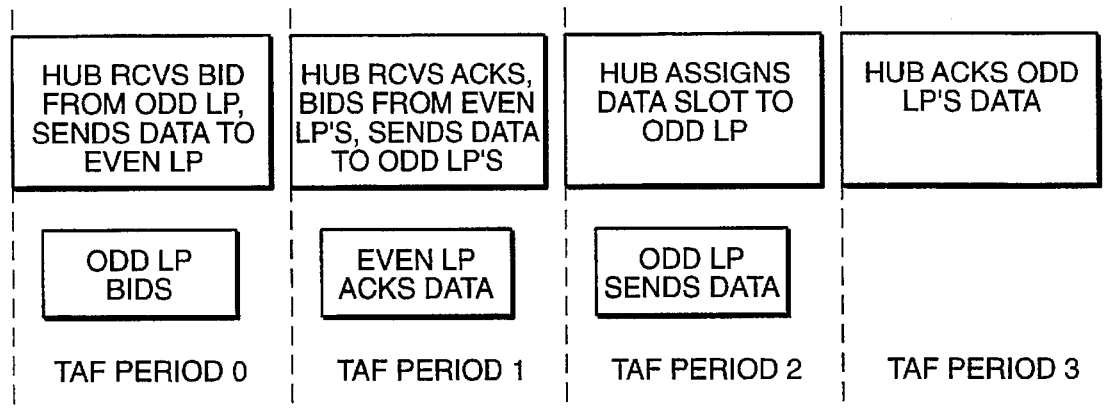
FIG._7
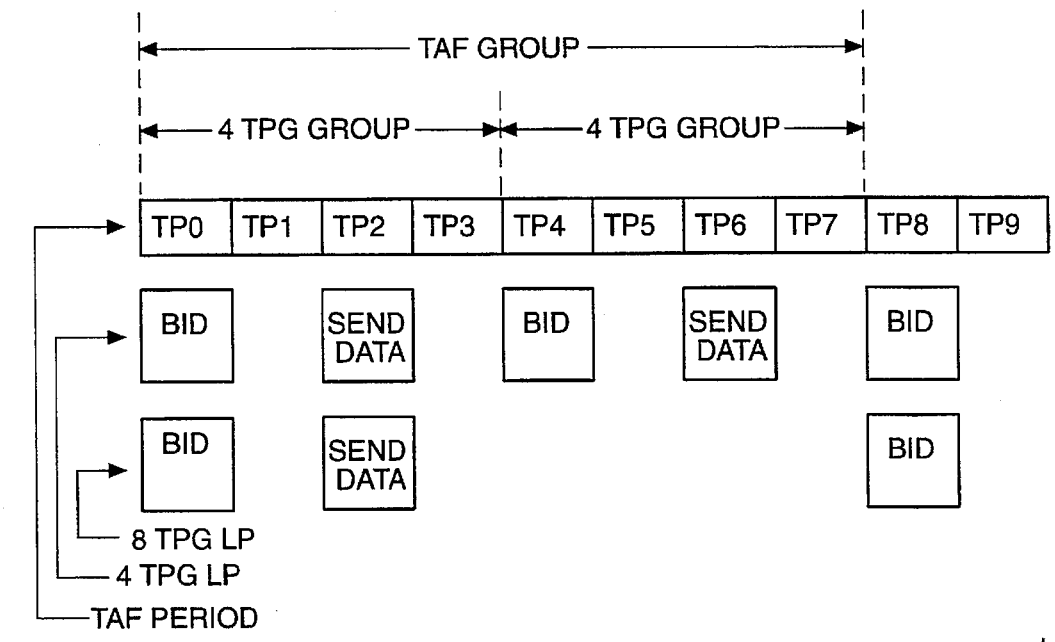
FIG._8

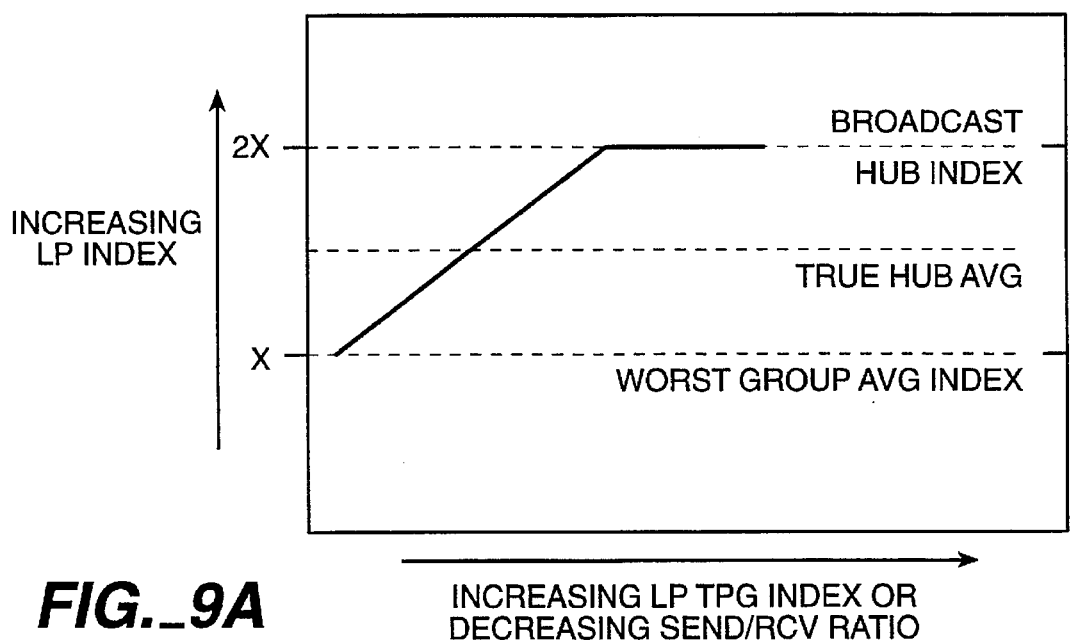
FIG._9A
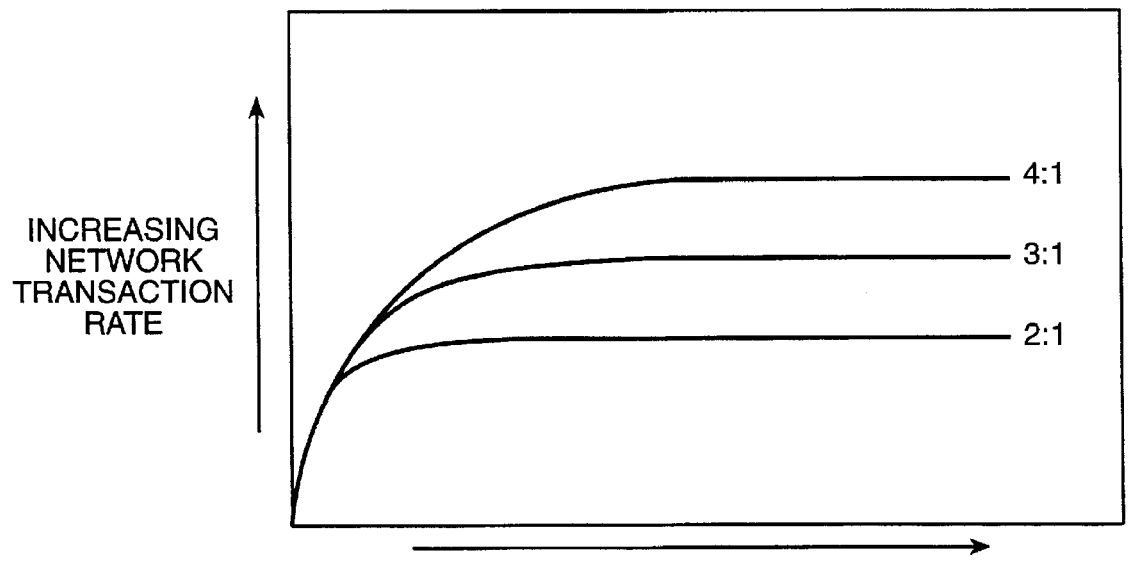
FIG._9B

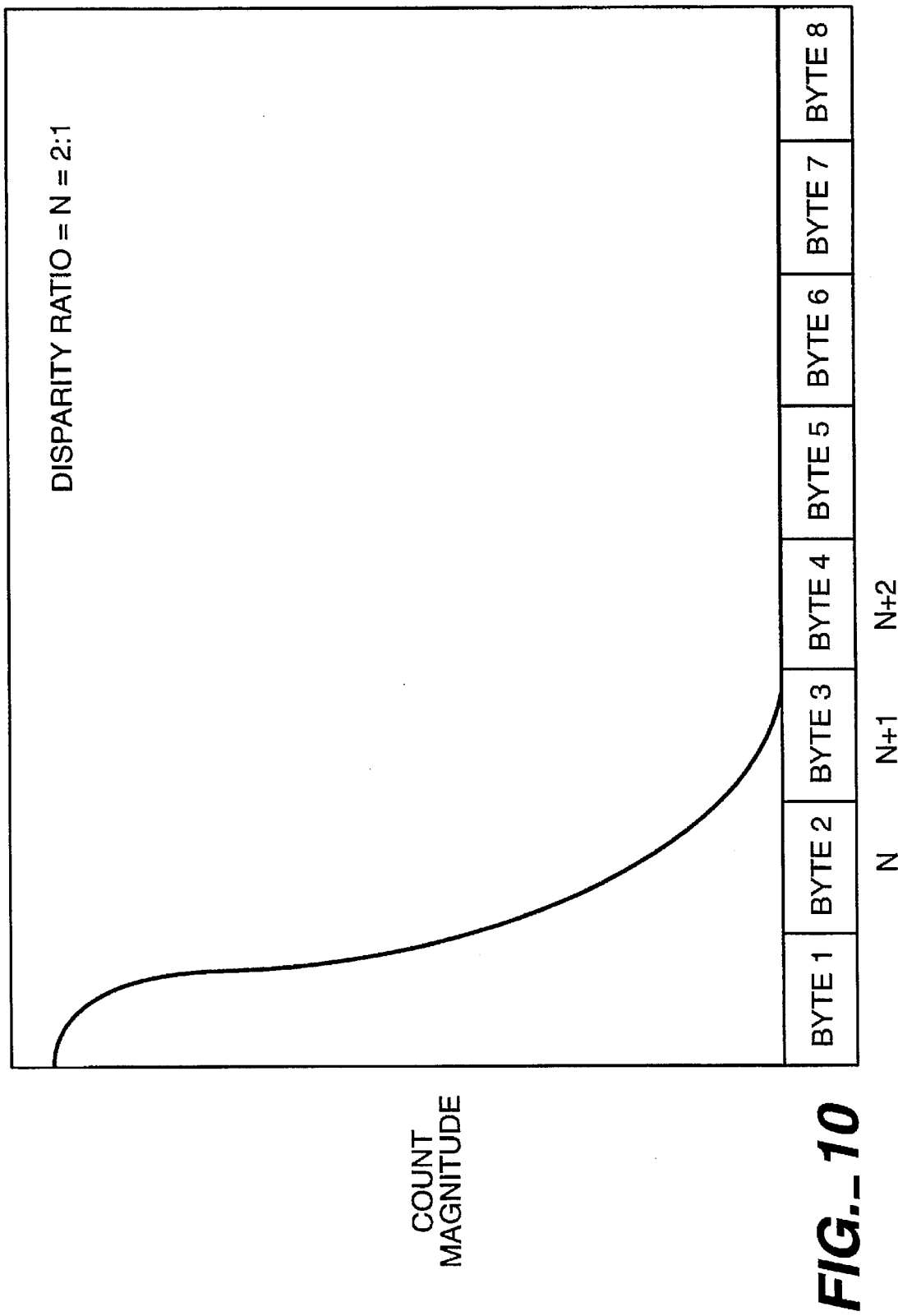
FIG._10

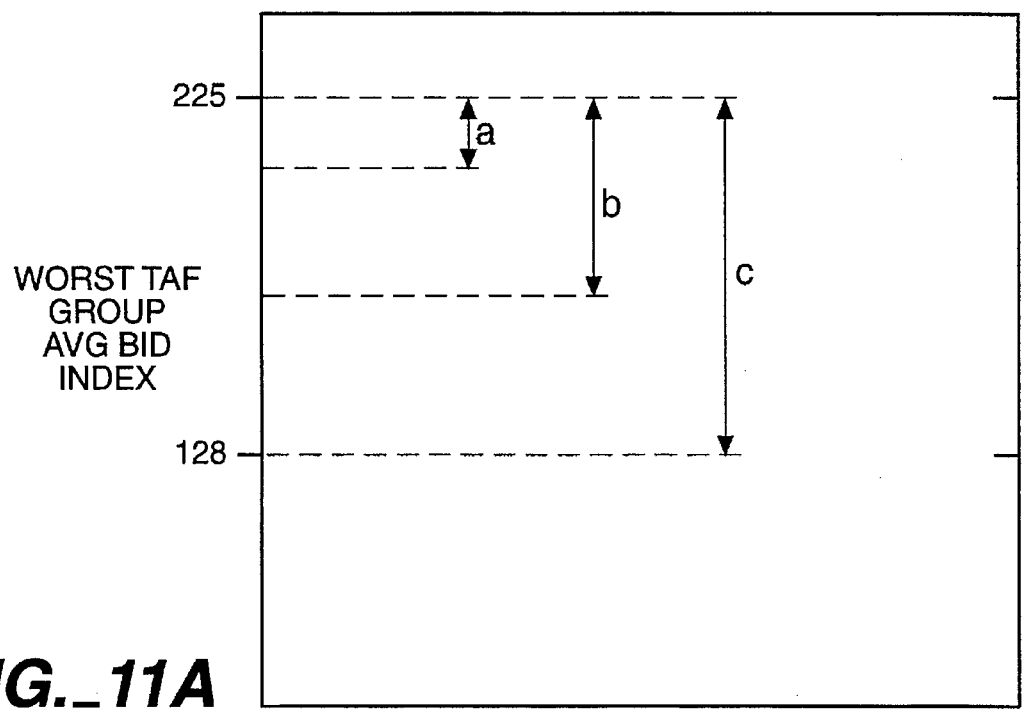
FIG._11A
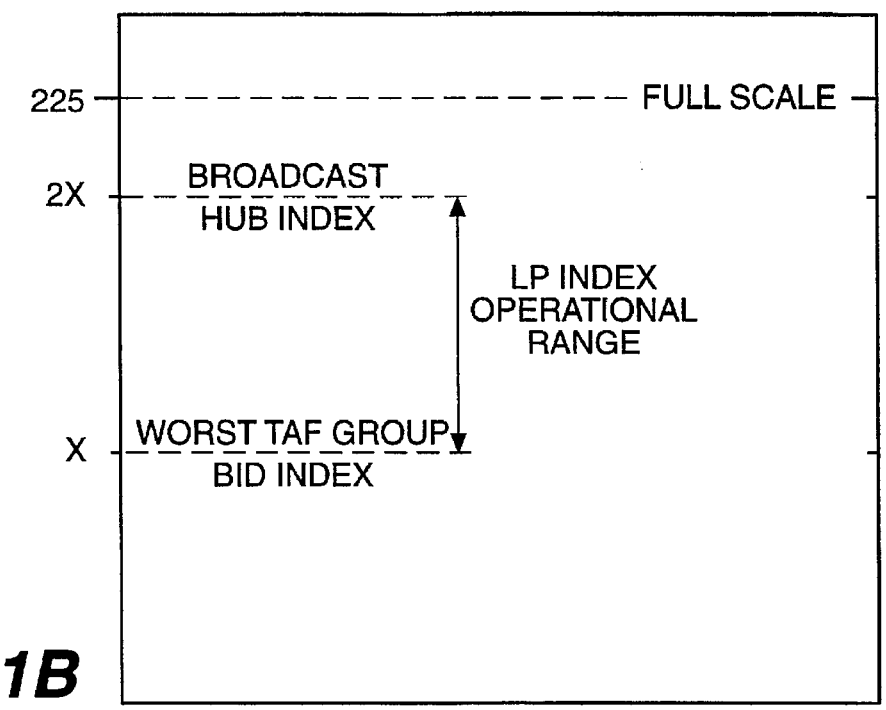
FIG._11B

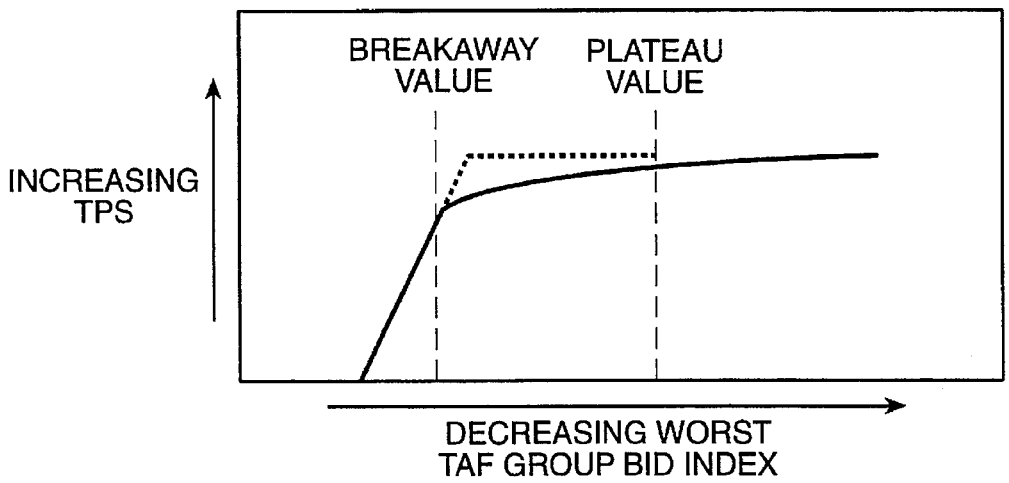
FIG._12
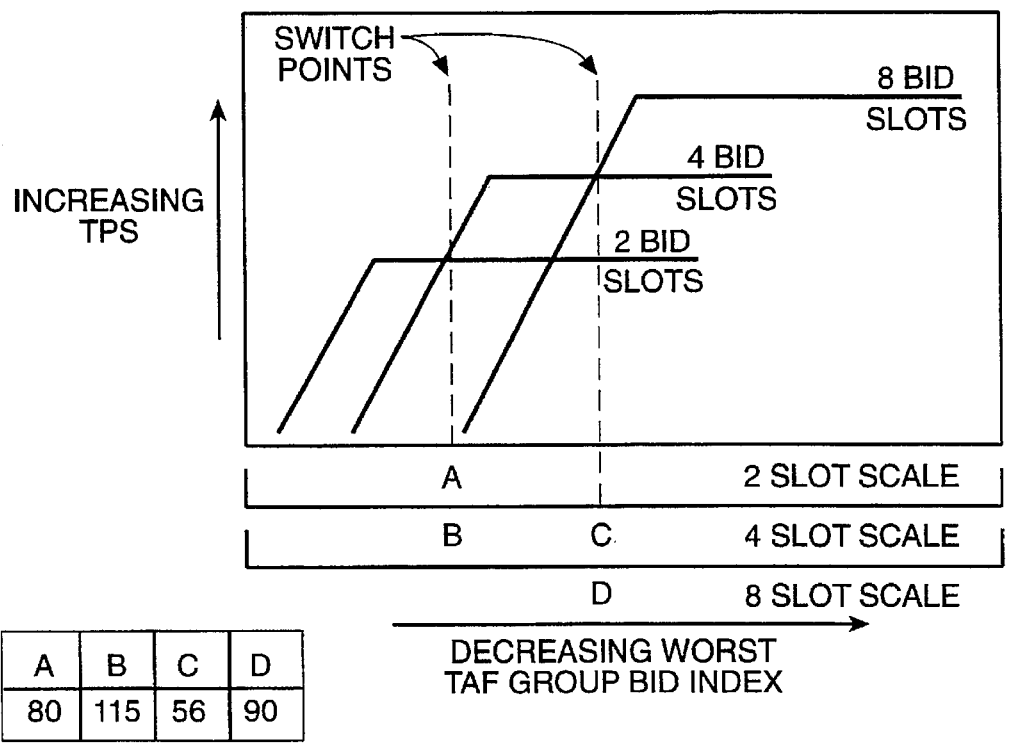
FIG._13

METHOD AND APPARATUS FOR MANAGING A NUMBER OF TIME SLOTS DURING WHICH PLURAL BIDDING DEVICES CAN REQUEST COMMUNICATION ACCESS TO A CENTRAL DEVICE

BACKGROUND OF THE INVENTION

1. Field of the Invention

The present invention is generally related to the field of data communications, and more particularly, to the arbitration of access among plural bidding devices which communicate with a central device.

2. State of the Art

Communication systems are known wherein a central unit, commonly referred to as a hub, is connected via a communication link with one or more remote units. The communication link can, for example, be a frequency modulated radio link using a radio access protocol (RAP).

Because the plural remote units cannot all communicate with the hub at the same time, various arbitration techniques have been developed for arbitrating their access to the central unit. One known arbitration technique is the slotted reservation ALOHA protocol which was developed at the University of Hawaii several decades ago. The slotted reservation ALOHA protocol arbitrates access among plural remote units to the hub by allocating a small portion of the overall system throughput to small time windows referred to as "bid slots". The remote units use the bid slots to transmit short bid packets to the hub. Each bid packet merely represents a request to reserve larger time slots in the future for actual data packet transmission. By supplying relatively short bid packets to the hub from each of the remote units, the hub can organize future allocation of the communication link among the various remote units to provide efficient transmission of information over the communication link.

The use of bid slots to reserve future data transmission time slots pursuant to the slotted reservation ALOHA protocol eliminates the possibility of two remote units attempting to transmit data packets at the same time. The collision of data packets, which results in the waste of an entire data transmission time is thereby avoided. However, because the remote units can transmit their short bid packets at the same time, a collision of bid packets can occur.

The potential for colliding bid packets can result in remote units which are physically located at a distance from the hub never being heard by the hub. For example, in wireless links, remote units which are physically located closer to the hub typically overwhelm the transmissions from remote units which are physically located at a distance from the hub, thereby causing shadow zones of remote units whose bids cannot be serviced equitably. Consequently, if a remote unit which is located next to the hub transmits a bid packet at the same time a remote unit physically located at a distance from the hub transmits a bid packet, only the bid packet from the closer remote unit will be heard by the hub. Although a collision should have occurred thereby requiring both remote units to retransmit their bid packets, in actuality, the closer remote unit will be heard and serviced to the exclusion of the more distant remote unit. Thus, over a period of time, closer remote units will be heard on a more regular basis than remote units located at a distance from the hub.

The effect of collisions in communication networks, and in particular, wireless communication networks, has been addressed with numerous modifications to the slotted reservation ALOHA protocol technique. One technique for addressing the occurrence of collisions is to configure the hub to detect bid collisions and take unilateral action to attempt to ensure a fairness in bidding among all remote units. For example, when the frequency of bid collisions nears a predetermined value, the hub can be configured to take action. One such action might be the addition of more bid slots to the protocol overhead. Alternately, the hub could dynamically switch to a more "polled" style of operation in which the hub initiates communication with the remote units. However, such unilateral actions by the hub, in which the true success rates of individual launch pads are not taken into account, usually result in significant losses in overall system efficiency.

A second technique for addressing the occurrence of collisions in a communications network is to provide peer carrier sensing at the remote units. In accordance with this technique, each remote unit's bid transmission is preceded by an attempt to detect simultaneous transmission by another remote unit. If an impending collision is detected, the later bidder defers transmission to another bid slot to avoid the collision. This technique, while reducing the potential for collisions, requires enhanced complexity at each of the remote units and imposes a delay on bid transmission, thereby degrading efficiency since each remote unit must independently monitor the communication network before transmitting a bid packet.

A third known technique for addressing the occurrence of collisions in a wireless communications network is the use of variable transmit power among each of the remote units. In accordance with this technique, each remote unit can alter its transmit power level when faced with an inability to be heard at the hub. Using this technique, remote units located far from the hub, or shadowed units, can be heard by the hub despite the typical dominance of remote units located in closer proximity to the hub. However, this technique requires increased complexity of the remote units to provide the ability to vary their transmit power.

Thus, while techniques are known for arbitrating access among plural bidding devices vying for access to a central device in a communications link, these techniques do not effectively address the occurrence of bid collisions without significantly degrading overall operating efficiency.

SUMMARY OF THE INVENTION

The present invention is directed to maximizing efficiency, or throughput, in a communications network where plural bidding devices arbitrate for access to a central device, while maintaining fairness in the bid arbitration process and thereby enhancing overall operating efficiency of the communications network. Such enhanced operation is achieved by providing at least one central device, such as a hub, with an ability to receive bid indices representing bid success rates from each of a plurality of secondary devices. The plurality of secondary devices can be remote units referred to herein as launch pads. The bid indices represent the ability of each launch pad to successfully arbitrate for access to the hub. The hub collects the bid indices from all of the active launch pads and evaluates (for example, averages) them over a reasonable period of time to create a hub goal index. The hub goal index is then broadcast back to all of the launch pads so that each of the launch pads can evaluate its own bid index relative to the hub goal index, and then use this information to modify its frequency of bidding for future access to the hub.

As a result of using a hub goal index, the launch pads can, in practice, spread into different bidding groups, each bidding group having a unique bid-to-data-transfer cycle time. Thus, in accordance with exemplary embodiments, at the same time the hub creates the hub goal index, the hub can also create a group bid index for each launch pad bidding group. The hub continually monitors a worst group bid index and uses it to modify a number of available time slots during which the launch pads can bid for access to the hub. Thus, the number of bid slots is adjusted during operation as a function of the changing worst group bid index to maximize system throughput for a given network load, while maintaining bidding fairness among launch pads.

Generally speaking, exemplary embodiments of the present invention described herein are therefore directed to a method and apparatus for arbitrating communication between a first device and a plurality of secondary devices. Exemplary embodiments include the steps of establishing a time assignment frame period as a basic unit of communication between said first device and said plurality of secondary devices; establishing an index representing an ability of at least two of said secondary devices to communicate with said first device; and adjusting a number of time slots within said time assignment frame period in response to said index, each of said time slots providing a period of time during which said secondary devices can request access to said first device.

BRIEF DESCRIPTION OF THE DRAWINGS

The present invention can be further understood with reference to the following description and the appended drawings, wherein like elements are provided with the same reference numerals. In the drawings:

FIG. 1 illustrates a communication network having a wireless link in accordance with an exemplary embodiment of the present invention;

FIG. 2 illustrates an exemplary time assignment frame (TAF) period for illustrating possible transmission events and their timing;

FIGS. 3a–3c illustrate an exemplary header frame included in each time assignment frame period of FIG. 2;

FIG. 4a illustrates the general structure and timing of exemplary launch pad transmit frames, or packets, which can be any one of acknowledge, bid and data transmit slots of the FIG. 2 time assignment frame period;

FIG. 4b illustrates an exemplary bit definition of the launch pad bid frame in greater detail; and FIG. 4c illustrates an exemplary bit definition of the launch pad acknowledge frame in greater detail;

FIG. 5a illustrates an exemplary bit definition of a hub data header for a hub data frame in greater detail; and FIG. 5b illustrates an exemplary bit definition of a launch pad data header for a launch pad data frame in greater detail;

FIGS. 6a–6c illustrate time assignment frame period sequencing using a half duplex hub, a full duplex hub and improved use of a full duplex hub, respectively;

FIG. 7 illustrates an exemplary bidding and data transfer sequence for an odd numbered launch pad;

FIG. 8 illustrates bid behavior of two odd numbered launch pads, one having four time assignment frames per group and another having eight time assignment frames per group;

FIG. 9a illustrates a relationship between a worst launch pad group average index, a true average index calculated at the hub, and a broadcast hub index;

FIG. 9b illustrates system transaction rate stability with increasing launch pad load, at the cost of increasing round trip delay, for three different disparity ratios;

FIG. 10 illustrates a distribution curve in accordance with an alternate exemplary embodiment of the invention, wherein a count magnitude is illustrated for each of eight bytes in a byte array;

FIG. 11a depicts the magnitude of a worst TAF group bid index relative to a full scale index value for three different network load conditions;

FIG. 11b depicts the relative magnitudes of a full scale bid index, a broadcast hub goal bid index, and a worst TAF group bid index for a network load condition in which the hub goal bid index is less than the full scale bid index;

FIG. 12 is a plot of overall network throughput, as measured in transactions-per-second at a hub, versus a decreasing worst TAF group bid index; and FIG. 13 is a plot of overall network throughput, as measured in transactions-per-second at a hub, versus decreasing worst TAF group bid index, for three different bid-slot configurations.

DETAILED DESCRIPTION OF THE PREFERRED EMBODIMENTS

FIG. 1 illustrates a communication network 100, representing an apparatus for arbitrating communication between a first device and at least one second device. In the exemplary FIG. 1 embodiment, a first device is represented as a hub 102 which communicates with plural second devices represented as launch pads 104, 106 and 108 via a wireless (e.g., radio frequency) link 110.

The hub can be attached via one or more links, such as a serial link or interface 112 to one or more pieces of user equipment, collectively represented as central site user equipment 114. The central site user equipment 114 can, for example, comprise a single host computer. The host computer communicates with the hub 102 via a central site communications protocol, supported at the hub by the central site application program 116.

Each of the launch pads 104, 106 and 108 are configured in a manner similar to that of the hub, with connections via serial interfaces 118, 120 and 122 to remote site user equipment 124, 126 and 128, respectively. As with the central site application program 116 of the hub, each of the launch pads can include a remote site application program 130, 132 and 134, respectively.

As mentioned previously, the communication network of FIG. 1 includes a wireless link over which each of the launch pads can communicate with the hub. In accordance with exemplary embodiments, this communication is performed via any known radio access protocol (RAP). Accordingly, the hub includes a radio access protocol interface 136, and each of the launch pads includes a radio access protocol interface 138, 140 and 142, respectively. The radio access protocol interface provides data communications services across the wireless link to and from the hub for each of the launch pads.

The radio access protocol functionality can be broken into two parts: (1) transfer of user-generated data across the wireless link which requires the definition and development of a communications protocol suitable for the point-to-multi-point environment; and (2) interaction of the radio access protocol with the hub and launch pad application programs.

Regarding the first area of functionality, exemplary embodiments are directed to the use of a modified slotted reservation ALOHA protocol. Modifications to this protocol in accordance with exemplary embodiments of the present invention use performance standards to establish a platform of fair access of all launch pads to the hub while maximizing data transfer, even when classical network analysis would indicate that the system is heavily overloaded.

The second area of radio access protocol functionality relates to its interaction with all software modules in the system such that communication across the wireless link among peer programs can be established. By establishing definite links in the communication network, the host computer of the hub can communicate with the many remote site user equipment units, with appropriate address definition to ensure delivery of user data to the correct destination.

In accordance with exemplary embodiments, the radio access protocol presumes that a data transfer process is initiated by a launch pad in response to activation of remote site user equipment. A launch pad which is active requests access to the hub for data transfer across the wireless link. Return data from the central site host computer of the hub is supplied in response to the active launch pad. The request by the launch pad and the response from the hub together constitute a "transaction". As referenced herein, "data" can include any information transmitted over the wireless link.

In accordance with exemplary embodiments, a transaction represents a fundamental unit of radio access protocol performance, and is measured in transactions-per-second (TPS). The measurement of radio access protocol performance based on transactions-per-second can be monitored at the launch pad to indicate the performance of a single launch pad; alternately, such monitoring can take place at the hub to demonstrate cumulative network capability at any given time.

In addition to radio access protocol performance as measured in transactions-per-second, round-trip delays (RTD) are also monitored at each launch pad to track the amount of time needed for a given transaction to complete from launch pad initiation to response reception at remote site user equipment. Exemplary embodiments of the present invention are directed to maximizing the transactions-per-second of the communication network, while minimizing the round-trip delay, and at the same time, monitoring overall "fairness" of the system.

As referenced herein, "fairness" of the system refers to an ability of all launch pads to gain reasonably equal access to the data communication services provided by the radio access protocol, even at the expense of the transactions-per-second and round-trip delay. Fairness can be measured in a ratiometric manner referred to herein as a "disparity ratio".

For purposes of the following discussion, a "disparity ratio" is a comparison between the best and worst service access of all launch pads. Exemplary embodiments balance the performance standards of transactions-per-second and round-trip delay with the disparity ratio to achieve enhanced overall operating efficiency.

For purposes of illustrating features of the present invention, an implementation of a radio access protocol in accordance with the present invention will be described in greater detail. Referring to FIG. 2, a time assignment frame (TAF) period is illustrated as a basic unit of transfer between the hub and the launch pads. The TAF period is used to perform multiple functions in accordance with an exemplary radio access protocol of the present invention. These functions are allocated within the TAF period, and include: (1) synchronizing timing of the plural launch pads and the hub; (2) supplying bids from the launch pads to the hub in order to receive assignments for future data transmission times; (3) exchanging data packets between the launch pads and the hub; and (4) sending acknowledgements from the launch pads to the hub or vice versa following successful data transmission.

In accordance with the exemplary embodiment illustrated in FIG. 2, a TAF period includes three portions: (1) a first portion referred to in FIG. 2 as a "TAF Frame" is a TAF/Ack/Assignment header in which the hub transmits control information, data acknowledgements, and time assignments to the launch pads; (2) a second portion which includes data acknowledge slots and bid slots, during which the hub listens for launch pad transmissions of data acknowledgements and bids for assignments of future data transmission times, respectively (note that because the hub can be a full duplex device, hub transmission of data can occur at the same time the hub listens for data acknowledgements and bids from the launch pads); and (3) a third portion which occurs at the end of the acknowledge and bid slots, during which those launch pads that have been previously assigned data transmission times within the given TAF period can transmit their data packets to the hub.

The first portion of the TAF period, referred to as the "TAF Frame" in FIG. 2 is a TAF/Ack/Assignment header which includes: (a) a TAF header which carries synchronization and control information to the launch pads; (b) Acknowledgement headers which signal the hub's reception of error free launch pad data packets; (c) and time Assignment headers (also referred to as bid assignment headers) directed to the launch pads to indicate future data transmission times which have been assigned to launch pads whose bid packets were previously received by the hub.

The second portion of the FIG. 2 TAF period represents a period of time during which the hub begins listening for: (a) launch pad transmissions of launch pad acknowledgements (in response to receipt of hub data transmissions); and (b) launch pad bid packets. The launch pad acknowledgments and bids are included in a series of timed "slots" (for example, up to 16 slots in the FIG. 2 embodiment). A first number of the slots (e.g., 8) are used for launch pad transmission of the data acknowledgements signaling error free reception of hub transmitted data packets. A second number of the slots (e.g., 8) constitute the bid slots during which launch pads request a time in the future for transmission of their data. As mentioned previously, during this second portion of the TAF period, the hub may begin its data packet transmission if out-bound data is ready. Such out-bound packets are transmitted back-to-back. In accordance with an exemplary embodiment, up to eight out-bound packets can be transmitted per TAF period.

The third portion of the TAF period occurs at the end of the acknowledge and bid slots. During this third portion of the TAF period, launch pads which were previously assigned data transmission times in earlier TAF periods can begin transmission of their data packets to the hub. Each packet begins transmission at a time which has been preassigned by the hub, as specified in the time assignment header of the TAF frame that granted the data transmission request. The data transmission from the launch pad to the hub is limited to the period of time that was initially requested. In accordance with exemplary embodiments, up to eight data transmission time assignments can be granted for each TAF period. Data formats for each of the three portions of a TAF period will now be described in greater detail.

I. TAF/ACK/ASSIGNMENT HEADERS OF A TAF PERIOD

An exemplary TAF frame, or TAF/Ack/Assignment header, is illustrated in FIG. 3a as including a TAF header, Acknowledgement headers and Assignment headers. A TAF header is a fixed length packet for carrying synchronization and control information out-bound from the hub. A hub transmit interrupt which occurs at the end of a TAF frame transmission can be considered to occur simultaneously with a launch pad receive interrupt of the same TAF frame. These interrupts reset timers included in both the launch pad and the hub to establish an implied TAF period initialization time $t_0$.

An exemplary TAF header is illustrated in FIG. 3b as a fixed length field representing the first byte set transmitted from the hub during each TAF period. The TAF header can be broken into three fields for purposes of the exemplary embodiment described therein: (a) an address field for notification of the launch pads of the hub's return address; (b) control and synchronization bits; and (c) timing information.

Referring to FIG. 3b, a TAF header is shown to include a frame type field which is set to identify the information transmitted as a TAF header. A TAF parity field is a parity bit which the hub transmits in each TAF frame representing the least significant bit of a TAF counter included in the hub. This parity bit is used to identify the current TAF period as either an even numbered TAF period or an odd numbered TAF period, and is used to synchronize all network elements with respect to odd and even periods. The launch pad checks this bit each TAF period and sets or resets its least significant counter bit if agreement has been lost. In accordance with exemplary embodiments, a first set of launch pads are designated even numbered launch pads while a second set of launch pads (that is, the remaining launch pads) are designated odd numbered launch pads. By designating the launch pads as either even numbered or odd numbered launch pads, and by tracking whether a current TAF period is an even numbered period or an odd numbered period, duplex communication can be exploited during the second portion of the TAF period in which the launch pads transmit acknowledgement and bid packets to the hub.

To track whether the current TAF period is an even numbered period or an odd numbered period, both the hub and the launch pads of an exemplary embodiment count TAF periods by incrementing running counters with each TAF frame transmit or receive interrupt. Although the count values of the counters in the hub and the various launch pads seldom agree, exemplary embodiments of the present invention rely only on the hub and all launch pads agreeing on whether a given TAF period is odd or even numbered. Accordingly, the parity bit is used to provide this service. The duplex communication feature based on odd and even numbered TAF periods will be later described more fully with respect to FIGS. 6a–6c.

An acknowledge slot count field of the TAF header is provided so that the hub can notify all launch pads as to the number of in-bound acknowledgement slots scheduled by the hub in the second portion of a given TAF period. The launch pad calculates a start of the first bid slot by multiplying the number of acknowledgement slots by the acknowledgement slot length and referencing this value to $t_0$. As a result, a launch pad transmitting a bid packet in the second portion of the TAF period can wait for all pre-assigned acknowledge slots to complete, thereby preventing launch pad acknowledgments sent by a given launch pad to the hub from colliding with a simultaneous bid transmission from another launch pad.

The hub remote ID field is used to distinguish the destination of launch pad transmitted data packets in multiple hub systems, or to detect at the launch pad a changeover to a new hub in the event of a central site failure.

A broadcast override field is provided and can be used to halve the transmit time of large quantities of broadcast packets. The broadcast override mode can be contrasted with an exemplary normal mode operation, wherein launch pads only listen to and process data packets from TAF periods whose parity matches the least significant bit of the launch pad's identification (that is, launch pads observe their identity as even or odd numbered launch pads in communicating with the hub). During normal mode operation, data packets received by a launch pad during periods of unmatched parity are typically discarded to halve the resources required by the radio access protocol program and to give the launch pad an entire TAF period of idle reception activity to process meaningful frames. However, the normal mode of operation requires that frames which are to be broadcast to all launch pads by the hub be sent twice; once in an even TAF period and once in an odd TAF period. The broadcast override bit can therefore be used to signal the launch pad that the hub is operating in a single broadcast transmit mode, and that all received data packets should be processed by the launch pad regardless of TAF period parity. Thus, if launch pads detect a broadcast override field in the TAF/Ack/Assignment header, all data packets transmitted from the hub in both even and odd numbered TAF periods are monitored by all active launch pads. For certain purposes, such as downloading new code, the alternate even/odd TAF period functionality can thus be disabled so that launch pads will accumulate all data frames transmitted from the hub.

A bid slot count field of the FIG. 3b TAF header includes the number of bid slots in each TAF period. The available number of such slots can, in accordance with exemplary embodiments, be varied by the hub in response to an evaluation of the bidding process. When added to the number of acknowledgement slots in a given period and multiplied by the length of a single slot, the end time of the slot sequence, and hence the start time of the launch pad data packet transmission sequence, can be calculated.

The hub bid index field of the TAF header is a goal index based on an averaged and modified accumulation of network bid processing performance. The hub goal index is calculated, in accordance with exemplary embodiments, on the basis of information regarding bid frequency and success rate collected during launch pad bid frame transmission. Once calculated, the hub's goal index is transmitted to all launch pads in the system via the hub bid index field of the TAF header. The launch pads use the hub's goal index to evaluate their individual performance level in the system and to take corrective action if necessary.

Having described an exemplary data format for the TAF header of FIG. 3a, attention will now be directed to an exemplary data format for the Acknowledgement and Assignment headers of the FIG. 3a TAF/Ack/Assignment header. The Acknowledgement and time Assignment headers can use the same data structure, such as the exemplary structure illustrated in FIG. 3c. Different fields of this structure are active for either the Acknowledgement or Assignment header. The launch pad to which the header is addressed can determine the header type by noting the parity of the TAF period in which it was sent and by evaluating which type of header it was expecting. Individual fields included in the Acknowledgement and Assignment headers of FIG. 3c will now be described in greater detail.

Referring to FIG. 3c, a launch pad remote identification field represents the physical launch pad to which the header is addressed. The remote identification field is valid in both Acknowledgement and Assignment headers.

A logical unit number (LUN) field of a destination address is active in both Acknowledgement and Assignment headers.

The logical unit number is used to index a launch pad database to track data packet sequence numbering and other housekeeping matters for each application program interacting with the radio access protocol.

A send sequence number field is a modulo 16 number used in the Acknowledgement header to indicate the sequence number to be attached to the next hub transmitted data packet. Send sequence numbers can be maintained in the launch pad database of both the hub and launch pad for each remote identification/logical unit number combination concurrently active.

A receive sequence numbering field is a modulo 16 number which constitutes an acknowledge mechanism of the radio access protocol. By indicating to the launch pad the packet sequence number the hub is expecting to see on the next launch pad data packet, implied acknowledgement of the previous packet is provided. Receive sequence numbers are maintained at both the hub and launch pads for each remote identification/logical unit number combination currently active.

A message field can also be included in the Acknowledgement and Assignment headers. The message field can, for example, be used to carry special radio access protocol to radio access protocol message functions.

A pipe count field is included to indicate to the launch pad in an Acknowledge header the number of data packets that the hub has delivered to the specified logical unit number without reception of a data acknowledgement from that application. The pipe count field can be used for transferring radio access protocol flow control information to the launch pads.

An octets reserved field is used by an Assignment header to indicate to the launch pad that its prior bid for hub assignment of a transmission time slot has been successful. The octets reserved field, in accordance with exemplary embodiments, always matches the number of bytes requested by the launch pad when it bid for a time assignment. This field is important for calculating a precise time which the launch pad has been assigned to transmit a data packet. More particularly, the end of the last bid slot is calculated by, for example, adding the total number of acknowledgement and bid slots of the current TAF period (as identified by the hub in the TAF/Ack/Assignment header) and then multiplying by the time of a single slot. The launch pad being granted a time assignment in response to a bid then considers the delay necessary for transmit due to the Assignment headers that preceded its Assignment header. For example, if a launch pad receives a time assignment in the fourth Assignment header of a TAF frame, the exact transmit time for that launch pad is the end of the last bid slot time plus the cumulative octets reserved byte times of the previous three Assignment headers. Assignment headers which follow the one specifically addressed to a given launch pad are of no particular interest to that launch pad. Using this information, a launch pad can determine an exact time after the initialization time $t_0$ for transmitting a data packet.

II. LAUNCH PAD ACKNOWLEDGE, BID, AND DATA FRAMES; HUB DATA FRAMES

Having described the TAF/Ack/Assignment header, attention will now be directed to the second and third portions of a TAF period; that is: (a) launch pad transmissions in acknowledge and bid slots; and (b) launch pad transmissions in data slots. Further, for the case of duplex data communications, hub transmission of data during the second and third portions of a TAF period will be discussed (note the hub transmission of data feature illustrated in FIG. 2).

At the outset, note that in accordance with an exemplary embodiment, launch pad acknowledgement and bid slots are identically timed because transmitted bid and acknowledgement packets are of similar length. Also note that although these packets can be of similar lengths, their internal structures can differ. Further, note that launch pad transmitted data packets are precisely placed in preassigned data transmit slots, the start of which is specified in the Assignment header of the TAF/Ack/Assignment header.

Before the exact contents of acknowledge, bid and data slots will be discussed in detail, the basic form of all such slots will be described collectively. In general, the acknowledge, bid and data slots of a TAF period include three parts: (1) a request-to-send to clear-to-send (i.e., an RTS-to-CTS) delay; (2) a frame transmission time for transmission of a bid, an acknowledge or data; and (3) a carrier bring-down delay, as illustrated in FIG. 4a. These elements of FIG. 4a will now be described in greater detail.

An RTS-to-CTS delay occurs due to the launch pads being half-duplex devices which are normally in a receive mode with their radio frequency (RF) carrier turned off. When the radio access protocol software indicates a desire to transmit to the hub by bringing the RTS active, the transmit carrier must first be brought up and stabilized. In addition, the launch pad radio must transmit the carrier for sufficient time to allow the hub to detect and achieve carrier lock. Only then can the launch pad radio activate the CTS signal to the radio access protocol to signal readiness to begin actual data transmission.

The frame transmission portion of a slot is provided because, regardless of the type of packet transmitted by the launch pad, the length of time calculated to send it must include the actual number of data bytes to be sent (including headers), opening and closing flags, and a two byte cyclic redundancy code (CRC). Transmit times for acknowledge and bid frames are of fixed length, while data frame transmit times are variable and are calculated at each transmission in accordance with an exemplary embodiment.

The carrier bring down delay portion of a slot is used to specify a delay which occurs upon completion of transmission of the ending flag of a frame (or packet), at which time the launch pad radio access protocol deasserts RTS to signal the radio to end transmission. At this time, the radio waits a given period of time (e.g., 60 microseconds) for all data bits to clear the transmitter, then turns off the transmit carrier. The hub requires an additional delay of, for example, 10 to 12 milliseconds for the carrier recovery firmware to lose lock and detect that the carrier is actually gone before the carrier from a second launch pad can be properly locked. These delays require a period of silence of, for example, 12 milliseconds, after any launch pad transmission before another launch pad can assert its RTS signal.

Having generally described the bid, acknowledge and data transmit slots, attention is now directed to launch pad bid frames in particular. A launch pad bid frame, such as the one illustrated in FIG. 4b, is transmitted within a bid slot to request assignment of data slots for later data packet transmission to the hub. In accordance with exemplary embodiments, as many as eight bid slots can be included in a TAF period. When a launch pad wishes to send a bid, it uses a random number generator to select which of the up to eight bid slots it will use and then times the start of that particular slot for sending a bid frame. If successful, the hub will receive the bid slot and process a time assignment header.

If the launch pad happens to select a bid slot that is chosen by some other launch pad for transmit in the same TAF period, a bit collision results. In most cases, one launch pad wins the bid collision, and its frame is received by the hub due to a stronger transmit energy (e.g., as a result of being physically closer to the hub). The loser then must bid again in the next appropriate TAF period.

As illustrated in FIG. 4b, a bid frame includes a number of fields. A frame type field is used for identifying the frame as being a launch pad bid frame.

A launch pad remote identification field identifies the address of the physical launch pad requesting the time assignment, as derived from, for example, the least significant bits of the launch pad serial number.

A logical unit number field designates the application from which the data packet to be assigned a time slot originated.

A launch pad bid-count field holds the number of times necessary to send a bid frame before reception of a time assignment. The launch pad bid-count can be considered a bid collision counter used in a bid fairness code according to an exemplary embodiment of the present invention. The launch pad bid index field can, for example, vary from one (a perfect bid) to up to 16 (that is, 15 consecutive collisions). It is reset when a transmit slot is assigned by the hub (that is, the hub received the bid) or it achieves the maximum count.

An octets reserved field represents the number of data bytes in the data packet for which the launch pad wishes a transmission time assignment, and includes all user data and radio access protocol data headers. However, the number represented by the octets reserved field does not include flags, CRC or other slot delays. Fixed overhead is assumed at both the hub and the launch pad, and automatically added into the transmission time calculations in accordance with exemplary embodiments. In accordance with exemplary embodiments, the octets reserved field can be larger than the actual number of data bytes to be sent, as in the case of piggy-backed bids.

A TAFs per group (TPG) field is, in accordance with exemplary embodiments, a number from 4 to 256 which indicates the frequency at which the launch pad is currently bidding. The TAFs per group is used in conjunction with the launch pad bid index in the bid fairness code.

Having described the launch pad bid frames which are transmitted within bid slots during the second acknowledgement/bid portion of a TAF period, a discussion will now be provided of launch pad acknowledge frames as illustrated in FIG. 4c. Acknowledge frames are sent by the launch pads in acknowledge slots during the second acknowledge/bid portion of a TAF period. Like bid frames, acknowledge frames are sent with all required slot timing. However, unlike bid frames, the particular acknowledge slot used by a launch pad to acknowledge a hub data packet is not chosen at random in accordance with exemplary embodiments. Rather, in accordance with exemplary embodiments, a launch pad is told which acknowledge slot to use by the hub in the header of the hub data frame. As the hub sends its data frame in a given TAF period, the acknowledge slots of the following TAF period are assigned sequentially to each data packet header. As a result, acknowledge collisions are avoided under normal operation, and inadvertent data retransmission does not occur.

Referring to FIG. 4c, a number of fields can be seen to be included in an exemplary acknowledge frame. A frame type field is coded with a value representing that the frame is an acknowledge frame.

A pipe count field serves the same flow control function as its counterpart in the acknowledgement header of the TAF/Ack/Assignment header. This field indicates to the hub the number of data packets that have been delivered to the addressed launch pad application without reception of a return acknowledge from that application.

A remote identification field represents the last six digits of the serial number of the physical launch pad acknowledging a received data packet.

A logical unit number (LUN) of the application program which received data packets currently being acknowledged is included in a logical unit number field.

A receive sequence number field specifies the number of valid frames received by the remote identification/logical unit number addressee modulo 16. Transmission of an acknowledge frame with this number incremented by one implies error-free reception of the data packet being acknowledged.

An octets requested field is also included. To avoid the bid process when a launch pad has a plurality of data packets to transmit, the launch pad can attach an octets request on an acknowledge frame if it has data to transmit to the hub at the time the acknowledge is sent. The piggy-backing of bids on acknowledge frames and launch pad data frames increases the overall performance of the system in heavily loaded situations. The octets request field is handled at the hub as though it arrived in a bid frame.

Having described launch pad bid and acknowledge frames, attention is now directed to the third and final portion of a TAF period as illustrated in FIG. 2; namely, launch pad data transmission frames. However, before describing launch pad data frames transmitted by the launch pads, a discussion of hub data frames transmitted by the hub will be provided.

Recall that as discussed with respect to FIG. 2, the hub can begin its data packet transmission immediately following a TAF/Ack/Assignment header if out-bound data is ready since the hub can, in exemplary embodiments operate in full duplex. Transmission of data packets as hub data frames out-bound from the hub is thus initiated immediately upon receipt of the transmit interrupt of the TAF/Ack/Assignment header which coincides with the end of the "TAF Frame" shown in FIG. 2. These data packets are sent one after the other until a maximum number of data packets per TAF period has been transmitted, or there are no remaining data packets to transmit. A hub data frame, or packet, is the application's data packet with the addition of a hub data header, as illustrated in FIG. 5a. More particularly, referring to FIG. 5a, a hub data frame is hard coded as such via the frame type field.

A message field can be used to indicate to a remote launch pad the type of data packet which follows, such as a connect request data packet, a connect acknowledge data packet, a data request data packet and so forth. The presence of the message field allows the launch pad to speed its packet processing since it need not decode the packet type from the data itself.

A remote identification field can be represented as the least significant 6-digits of the serial number of the launch pad to which the data packet is addressed.

A logical unit number field can be used to represent the logical unit number of applications to which the data packet is addressed.

An acknowledge slot field can be used by a launch pad which was addressed to receive data from the hub in a preceding TAF period to enhance operation. During the acknowledge slot field, the launch pad can transmit its acknowledgement of having previously received a data packet from the hub.

Finally, a send sequence number field can be used to represent the sequential number of data packets modulo 16.

Having described a hub data frame, a launch pad data frame will now be described with respect to FIG. 5b. As mentioned previously, launch pad data frames are transmitted as carefully timed events. The launch pad, having bid for a data packet transmit slot, is sent a time assignment by the hub in the TAF period the hub has scheduled for it. The launch pad calculates the exact transmit time by adding the number of acknowledge and bid slots in that TAF period, as well as the byte transmit times in the octets reserved fields of the time assignment headers that precede its own. The launch pad then waits for this amount of time, initiating its timer with the received interrupt of the TAF frame, and begins transmission of its single packet. In accordance with exemplary embodiments, the launch pad cannot send more than one packet per TAF period.

Referring to FIG. 5b, a launch pad data frame is identified as such in a frame type field.

A message field serves the same function as its counterpart in the hub data header to indicate the content of the data packet to which the header is attached.

A remote identification can, in accordance with exemplary embodiments, be represented as the least significant 6 digits of the serial number of the launch pad from which the data packet originated.

A logical unit number field represents the logical unit number of the application program which originated the data packet.

A send sequence number field represents the sequential number of the data packet, modulo 16.

An octets request field is used to minimize the bid process. That is, since bid slots are the limiting resource for radio access protocol performance, a launch pad with multiple data packets buffered for transmission can request a data transmit slot by piggy-backing an octets request into the launch pad data header. The hub processes this field exactly as if it were a bid.

A retransmit field can also be included in the launch pad data frame. It is desirable for the hub to maintain packet statistics in its launch pad database, such as the number of packets sent, received and retransmitted. One statistic the hub cannot measure directly is the number of packets lost while in-bound to the hub. Thus, the launch pad can fill in this missing data by incrementing the retransmit field of the launch pad data header with each successive transmission attempt. This field is then reset upon reception of an acknowledgement from the hub.

III. TAF PERIOD SEQUENCING

Having described the internal components of exemplary TAF periods, attention will now be directed to an exemplary way in which TAF periods are sequenced to best utilize system resources. In accordance with exemplary embodiments, attention will be focused on the use of full duplex radio capability of the hub, and bidding restrictions to allow all launch pads reasonably fair access to the bid process and thus to the host computer of the hub.

FIGS. 6a–6c represent three possible TAF sequencing approaches. As was described with respect to FIG. 2, the approach shown in FIG. 6c is used in exemplary embodiments of the present invention. However, it is instructive to consider other possible modes of operation.

FIG. 6a illustrates a TAF period wherein both the hub and the launch pads operate in half-duplex modes. Because this mode of operation excludes the possibility of both the hub and the launch pad transmitting and receiving data simultaneously, optimal efficiency of the overall communication network cannot be realized. In FIG. 6a, note that subsequent to the TAF/Ack/Assignment header (represented as the "TAF Frame" of FIG. 2) and subsequent to the acknowledge and bid frames, one of the launch pads transmits data. When the launch pad has completed its data transmission, the hub then transmits data. However, the transmissions by the launch pad and hub do not overlap.

FIG. 6b illustrates an improved use of a TAF period to enhance communication network efficiency. In the FIG. 6b illustration, a full duplex characteristic of the hub is exploited, such that the hub and a given launch pad can transmit simultaneously at least for a portion of the TAF period. However, those skilled in the art will appreciate that in permitting simultaneous transfer of data by the hub and a launch pad, collisions between the hub and the launch pad can occur. For example, if the hub transmits to a launch pad which simultaneously is attempting to transmit to it, full duplex percentages of valid data transfer can be significantly reduced.

Accordingly, to ensure that a hub does not transmit at the same time the launch pad is transmitting to it, full duplexing of the data transmit portion of a TAF period can be based on hub expectations of scheduled in-bound packets. More particularly, the hub is aware of which launch pads are sending in-bound data to it in any given period, since it was the hub that assigned the time slots via the transmission of its time assignment slots in the TAF frame. The hub can therefore allow transmission of out-bound packets to only those launch pads which it had not scheduled to transmit in-bound packets to it in the same TAF period.

Note that in FIG. 6b, the transmission of data from the hub cannot coincide with the acknowledge and bid slots, since without a higher level of protocol organization, the hub has no way of determining ahead of time when a given launch pad might bid for any future time assignment. Thus, while the FIG. 6b embodiment can enhance operation relative to that of FIG. 6a, the FIG. 6b embodiment still suffers the drawback that hub transmissions can not overlap the acknowledge and bid slots.

FIG. 6c illustrates an embodiment in accordance with the present invention wherein improved efficiency in hub transmit capability is achieved by pulling the hub transmit data packets back over the acknowledge and bid slots within a TAF period. To achieve the operation of FIG. 6c, the hub predicts which launch pad might bid in a given TAF period by limiting launch pads to specific times at which they can bid. In this way, the hub can transmit to launch pads which it knows in advance will not bid in given time slots of the TAF period.

More particularly, in accordance with an exemplary embodiment of the present invention, the TAF periods can be divided into alternating odd and even sets as described previously with respect to FIG. 3b. Similarly, the launch pads are divided into even and odd sets based on, for example, the least significant bit of their randomly assigned serial numbers. By establishing at least two independent sets of TAF periods (i.e., an even set and an odd set), the hub can transmit to even numbered launch pads and receive from odd numbered launch pads in even numbered TAF periods (e.g., TAF periods 0, 2, 4 and so forth); subsequently, during odd number TAF periods (e.g., TAF periods 1, 3, 5, and so forth), the hub can receive from even numbered launch pads and transmit to odd numbered launch pads. The result is illustrated in FIG. 6c, wherein launch pads are in the receive mode when, for example, the least significant bit of their serial number matches the period parity bit in the TAF header, and then switch to a transmit mode for data, acknowledgements and bids on a parity mismatch.

Thus, extended portions of a TAF period can be used for data transmission between the hub and launch pads without requiring a complex scheduling scheme. It is only necessary, in accordance with the exemplary embodiment illustrated, that the launch pads and hub stay in synchronization with respect to determining the parity of a given TAF period (that is, whether the TAF period is an even numbered TAF period or an odd numbered TAF period).

IV. BID AND DATA TRANSMIT CYCLE

Having discussed exemplary modes of data transmission between the hub and launch pads, a transmit cycle for bids from the launch pads and for data transfer will be discussed. This discussion will be provided in the context of a communication network operating according to the exemplary embodiment described with respect to FIG. 3c, wherein TAF periods are divided into odd numbered TAF periods and even numbered TAF periods.

For an odd numbered launch pad wishing to transmit data to the hub, the launch pad monitors parity mismatched TAF periods. More particularly, the odd numbered launch pad selects a bid slot and transmits a bid frame in an even numbered TAF period, as illustrated in TAF period $TAF_0$ of FIG. 7. The hub receives this bid in TAF period $TAF_0$ but takes no action on it in the subsequent TAF period $TAF_1$.

In the next even TAF period $TAF_2$, the launch pad receives a time assignment from the hub in the TAF header, which results in data transmission being timed for execution in the same second even period as the assignment (that is, TAF period $TAF_2$). In the next odd numbered TAF period $TAF_3$, the hub acknowledges the received data frame from the launch pad via its acknowledgement header of the TAF/Ack/Assignment header which is transmitted to the launch pad. The launch pad is then free to bid for another data slot in a third even TAF period (not shown), and this process can be repeated indefinitely.

In accordance with exemplary embodiments, piggy-backed bidding can be enabled such that multiple data packets can be transmitted from a launch pad to the hub without completing a transaction and going through a separate bid process. More particularly, in accordance with exemplary embodiments, the data frame header transmitted by the launch pad in TAF period $TAF_2$ of FIG. 7 can be coded with a non-zero octets request field to indicate a piggy-backed bid for the next data frame. The hub treats this non-zero octets request field from the launch pad as through a bid had been received in TAF period $TAF_2$, and issues a time assignment for a data slot two TAF periods later. Thus, a launch pad having a large number of data packets can bid one time, and then send in new data packets to the hub every other TAF period for as long as the data supply lasts.

A similar ability to piggy-back bids via a non-zero octets request field of the acknowledge frame can also be provided in accordance with exemplary embodiments of the present invention. For example, had a bid been piggy-backed to the acknowledge frame in TAF period $TAF_1$ of FIG. 7, the hub would have granted a time assignment to the even numbered launch pad in TAF period $TAF_3$.

Data transmission from the hub to the launch pads is much simpler than transmission from a launch pad to the hub. More particularly, to transmit data to a launch pad, the hub sends even numbered launch pads data packets in even numbered TAF periods, and receives launch pad's acknowledgements in the subsequent odd period. Similarly, the hub sends odd numbered launch pads data packets in odd numbered TAF periods and receives launch pad acknowledgements in the next even period.

V. BID GROUPS AND FAIRNESS

Having described data transfer between a hub and the launch pads of FIG. 2, a discussion will now be provided of mechanisms for establishing bid groups and overall fairness in accessing the hub in accordance with exemplary embodiments of the present invention. In the FIG. 7 example, a launch pad can begin a bid/transfer process every four TAF periods. Thus, the exemplary embodiments of FIG. 7 can be considered to have a bid frequency of one bid/transfer cycle every four TAF periods.

In accordance with exemplary embodiments, as the number of active launch pads increases, greater competition for available bid slots occurs. Thus, where one launch pad is physically closer to the hub than a rival bidding launch pad, the closer launch pad is more likely to win access to the hub, thereby forcing the more physically remote unit to re-bid. As a result, those skilled in the art will appreciate that physically closer launch pads can receive enhanced bid service relative to those launch pads physically located further from the hub. As a result, in a worst case, a small number of physically close launch pads can transfer data regularly (e.g., once every four TAF periods), while remaining units of the communication network suffer long transmit delays or an inability to send information to the hub at all.

Accordingly, exemplary embodiments include a mechanism to render the bidding process fair to all launch pads, regardless of their distance from the hub or the number of launch pads competing for available bid slots. In accordance with exemplary embodiments, a mechanism for providing fairness to all launch pads was developed keeping in mind that a deteriorating bid process, wherein some launch pads receive unacceptable bid service, is not necessarily detectable at the hub. For example, the hub may only receive information from a limited number of the launch pads which have a high success rate in their bidding and data transfer, and be completely unaware that numerous other launch pads further from the hub have been repeatedly bidding unsuccessfully for hub service.

More particularly, it is possible that bids from physically remote launch pads have collided and gone undetected by the hub, or that the hub detected an in-bound transmit carrier with an undiscernible packet in the bid slot, but was unable to discriminate this as a bid collision verses routine radio noise. Further, carrier detection with error packet reception cannot discriminate a bid collision between two launch pads or a collision among 20 launch pads.

Accordingly, exemplary embodiments of the present invention recognize that the launch pad can best determine its own bidding frequency and success rate, and that the launch pad can best adjust its bidding behavior to maintain an acceptable level of bid fairness within the communication network. For this reason, a fairness scheme in accordance with exemplary embodiments of the present invention enables each launch pad to monitor and regularly generate a bid index representing its performance based on the frequency and success rate of its bidding for access to the hub. Information used to generate this bid index is then forwarded to the hub in each bid attempt, where it is averaged with similar indices from all launch pads in the network. Consequently, the hub can generate and transmit a compiled hub goal index for the communication network back to each launch pad as a single indicator of the "health" of the total bid process among all bidding launch pads.

Using the goal index information, each launch pad can evaluate its bid performance relative to other launch pads in the communication network, and then adapt its bid behavior accordingly. For example, launch pads which have a high success rate in the bidding can, for example, be forced to bid less frequently (e.g., instead of bidding once every four TAF periods, be limited to bidding once every six TAF periods) while those doing poorly, can maintain or increase their bid frequency. For purposes of the following discussion, an increase in bid frequency will be referred to as a decrease in TAFs per group (TPG) while a decrease in bidding frequency will be referred to as an increase in TPG.

FIG. 8 illustrates an exemplary embodiment wherein the increase of TAFs per group is shown to have an effect of delaying transmission of bids by forcing higher levels of idle time. FIG. 8 illustrates the difference between two launch pads, one having a TPG of 4 and the other having a TPG of 8.

Because bidding is based on a set number of TAFs per group (that is, a launch pad can only transmit one time per group), each launch pad must maintain a running count of TAF periods. Using a counter, a launch pad having data to send to the hub detects the beginning of one of its TAF groups using modulo arithmetic on the TAF count. The launch pad then selects a random number of between 1 and the set TPG value (e.g., 4) and waits for that specific period within its TAF group before transmitting a bid to the hub.

By allowing launch pads to randomly select a TAF period within its TAF group for transmitting of its bid to the hub, overall communication within the communication network is more statistically distributed. When the randomly selected TAF period within a given group arrives, the launch pad selects another random number between 1 and the number of bid slots in the period (for example, 8 in the foregoing example of FIG. 2), and then a bid packet is transmitted in that slot to the hub. For example, where a given launch pad has a TPG of 4 (that is, the launch pad is permitted to bid once every 4 TAF periods) and has randomly selected TAF period 2 to transmit its bid, and has further randomly selected bid slot 5 to transmit its bid, a bid will be transmitted from the launch pad in bid slot 5 of TAF period 2 of a set of 4 TAF periods. In an exemplary embodiment, either one of or both of the: (1) bid slot selected, and (2) TAF period selected within the set of 4 TAF periods can be reselected with every bid made by the launch pad.

If the hub receives the bid from the launch pad as a result of successful bidding, the hub will transmit a time assignment to the launch pad two TAF periods later to signal successful bidding to the launch pad. On the contrary, if the bid fails or if there is another data packet to send, the launch pad remains idle for the remainder of the current TAF group, awaiting the start of a new TAF group and the initiation of a new bid cycle.

In accordance with exemplary embodiments, a minimum TPG is 4 and a maximum TPG is 256. By selecting a relatively large maximum TPG value, which in practice can never be achieved, index calculations are kept well away from data register limits. In accordance with exemplary embodiments, launch pads can increase or decrease their TPG within this range in increments of 1, 2 or any other number. However, in accordance with an exemplary embodiment wherein every other TAF period is unavailable for transmission by any particular even numbered or odd numbered launch pad, an increase or decrease in TPG by increments of two can be used.

VI. BID INDICES

Having described the mechanism for transmitting data and bidding for time assignments, a discussion will now be provided for an exemplary embodiment by which launch pads can calculate their individual bid indices in a manner which the hub can use to generate an average bid index for the communication network.

A. LAUNCH PAD BID INDEX

As mentioned previously, the bid index of a launch pad is a reflection of the frequency and success rate of bidding for time assignment slots from the hub. In accordance with an exemplary embodiment, each launch pad includes means, such as an on board processor, for establishing a first index representing an ability of the launch pad to communicate with the hub. For example, when a launch pad transmits a bid frame, it initializes an internal counter to one and then waits for a time assignment from the hub two TAF periods later. If the bid by the launch pad for a time assignment is unsuccessful, such that no assignment is received from the hub, the launch pad increments its internal counter and then re-transmits the bid frame. Upon reception of a time assignment, the internal counter of the launch pad indicates the number of times the bid frame had to be sent by the launch pad before it was received and acknowledged by the hub. This information is used by the launch pad to calculate its bid index.

More particularly, the value stored in the internal counter is averaged over four TAF groups to give an integrated picture of the launch pad's bid success rate, referred to herein as its bid send/receive ratio. The bid send/receive ratio represents the number of bid frames sent by a launch pad in four bid groups divided by the number of frames that actually were received by the hub. The inverse of the bid send/receive ratio (i.e., the bid receive/send ratio) varies in accordance with exemplary embodiments from zero to one.

In accordance with an exemplary embodiment, the frequency of bidding by a launch pad is a function of the launch pad's TPG, and is a measure of how many data frames a particular launch pad could have sent data in a fixed time period (e.g., a fixed time period of 256 TAF periods). For example, a launch pad of 4 TPG could have bid and sent data 64 times in 256 TAF periods while a 32 TPG launch pad could have bid and sent data only 8 times in the same 256 TAF periods. However, due to the existence of other launch pads in the communication network, it is unlikely that either of these launch pads would realize their full TPG data transfer potential since bid collisions would cause many TAF groups to be wasted.

Thus, a true measure of launch pad performance, in accordance with exemplary embodiments of the present invention, is represented as the number of data frames a given launch pad could have sent data in a given time period modified by the actual number of data frames sent as reflected in the bid send/receive ratio. These factors are combined and scaled to fix the variance, in accordance with the exemplary embodiment, from 0 to 256 using the following equation:

$$LP \text{ Bid Index} = \left[ \frac{\text{Scale}}{\text{Factor}} \right] \left[ \frac{1}{TPG} \right] \left[ \frac{1}{\text{Bid Send/Rcv Ratio}} \right]$$

$$= \left[ \frac{1024 * \text{Bids Rcvd}}{TPG * \text{Bids Sent}} \right]$$

In accordance with the exemplary embodiments, the launch pad bid index is a scaled indicator of a particular launch pad's bid process performance. Those skilled in the art will appreciate that the launch pad bid index equates performance of a launch pad bidding every four TAF periods which actually averages two bids per transmission, with a launch pad bidding once every eight TAF periods having a success rate very close to perfect.

Using the launch pad bid indices, efficiency of the overall communication network can be controlled to enhance efficiency based on the premise that by decreasing the frequency of bids, a launch pad may not only open up bid slots for other launch pads, but may actually increase its own performance if its collision rate was relatively high at the lower TPG (that is a higher bidding frequency).

While a means for establishing a first index within each launch pad has been described as being included in the launch pad, those skilled in the art will appreciate that the information necessary for calculating the first index of a launch pad can be transmitted to the hub and calculated therein. Alternately, the information can be transmitted to any user specified location for calculation of the first index associated with each launch pad. Further, those skilled in the art will appreciate that while a first index has been described as being calculated for all launch pads, any number of launch pads in the communication system can be configured to calculate a first index for transmission to the hub. For example in some situations, it is desirable to have certain launch pads operate within the communication network without monitoring the relationship of any calculated first index for that launch pad with any goal index established for the communication system.

In addition, those skilled in the art will appreciate that the various launch pads can be configured into groups, with the hub calculating a goal index for each of the groups. Thus, exemplary embodiments are generally directed to any communication network wherein at least one launch pad is provided with an associated first index that is used in conjunction with a goal index to adjust the bidding process of the launch pad within the communication network.

B. HUB GOAL INDEX

As mentioned previously, a hub goal index is calculated based on the information supplied to the hub from all launch pads, so that overall performance of the communication network can be determined. In other words, a goal index is calculated by the hub so that information regarding overall performance level of the communication network can be transferred back to each launch pad. As a result, each launch pad can determine its own performance relative to its neighbors.

The hub, in accordance with exemplary embodiments, includes means, such as a processor, for establishing a second index representing an ability of one or more launch pads arbitrating for communication with the hub to actually communicate with the hub. The hub processor, in an exemplary embodiment, uses the same equation described above with respect to the bid index calculated by each launch pad, and therefore uses the same base data.

Accordingly, in an exemplary embodiment, each bid frame of the launch pad includes a field indicating the number of times that a particular bid frame has been sent to the hub, and includes a field indicating the TPG of the bidding launch pad. The hub maintains a table (e.g., lookup table) of all TAF groups (e.g., 126 TAF groups in the example described above). As each bid arrives at the hub, the hub adds the bid attempts count to a running total which is kept for each group. A second running total is kept for the number of bids received in each group, and is incremented by one with the reception of each bid frame. To keep frequently bidding launch pads which have low TPG from statistically overwhelming less frequently bidding launch pads which have higher TPG, the send and receive counts can be weighted to generate a fairer statistical distribution among the various groups.

At the end of each set number of TPGs (such as every 2 TPGs corresponding to 8 TAF periods or every 4 TPGs corresponding to 16 TAF periods) the hub divides the number of bids sent by those received to construct an averaged send/receive ratio for that group. Because the TPG is known for each such ratio, the hub can evaluate a bid index for each group (such as an averaged bid index for each group), integrated over four group times (for a 4 TPG period) and weighted to compensate for bid frequency using the equation described previously with respect to the launch pad index. The averaging together of all TAF group indices results in a system wide mean value referred to herein as a hub index true average.

The true average alone can be retransmitted to each launch pad as a goal index for use as a means for comparing the goal index with the various launch pad bid indices within each of the launch pads such that each of the launch pads can modify their bidding frequency. However, it has been discovered that by merely broadcasting the cumulative index true average back to each launch pad in an effort to have each launch pad attempt to achieve this same index value, overall system performance is relatively poor.

More particularly, launch pads doing better than average would reduce their bid index by increasing their TPG (that is, reducing their bid frequency) and would thereby reduce their efficiency in communicating with the hub. Further, launch pads doing worse than the average would attempt to improve their bid index. However, because it would be more difficult for unsuccessful launch pads to improve their success rate than it would be for successful launch pads to worsen their success rates, the overall result of this modification to the communication network would result in a lower true average index. That is, the most efficient launch pads would degrade in operation while the less successful launch pads would only slightly improve. Eventually, all of the launch pads would migrate to the maximum 256 TAF period group such that overall operating efficiency of the communication network would degrade to unacceptable levels.

Accordingly, exemplary embodiments are directed to using the launch pad bid index and the hub goat index as described above in combination with additional information to actually improve operating efficiency of the communication network. The additional information is referred to herein as a disparity ratio.

C. DISPARITY RATIO

In accordance with exemplary embodiments, launch pads do not attempt to achieve a bid index which is comparable to that of the true average index calculated by the hub and retransmitted to the various launch pads. Rather, exemplary embodiments are directed to having the hub transmit a goal index to the launch pads for comparison therein with the various launch pad bid indices, the goal index being greater than the true average index calculated by the hub as described above. Such a goal index, in effect, artificially generates a counteracting upward pressure on the individual launch pad indices to improve beyond the true average index calculated by the hub. When the upward pressure imposed on the launch pads with the goal index transmitted from the hub is exactly matched by the downward force of increasing numbers of bid collisions in the communication network, the communication network can be considered to have arrived at a stable operating point, and will maintain itself within an index window of reasonable size, drifting up and down only slightly over time.

In accordance with exemplary embodiments, to achieve this artificial upward pressure via use of a goal index, the hub is configured for a predetermined disparity ratio which represents the ratio of bid indices between the best and worst launch pads in the bid process of the communication network. The disparity ratio can, for example, be varied within a range which includes, for example, ratios of 2:1 though 5:1, or any other desired ratios. In accordance with exemplary embodiments, rather than averaging the TAF group indices, the hub performs a search through its tables for the TAF group having the worst averaged index value, and then multiplies it by the disparity ratio to obtain the hub goal index. This hub goal index is then broadcast to all launch pads using the index field of the TAF header.

In practice, according to exemplary embodiments, the broadcast goal index is integrated heavily, with updated values incorporating only a substantial fraction (e.g., $\frac{1}{8}$) of the difference between the most recently calculated index and the previously calculated index. In addition, the hub goal index is only changed on predetermined TAF group boundaries (e.g., once every four TAF periods), thereby forcing updates to occur at the rate of generation of new launch pad bid indices in the group that was responsible for the previous low value. The use of integration can smooth out sudden changes in the index behavior and allow the system to establish stable operating points without substantial "ringing".

In accordance with exemplary embodiments, a balanced network carrying a 2:1 disparity ratio is illustrated in FIG. 9a.

VII. LAUNCH PAD RESPONSE TO HUB GOAL INDEX

In an exemplary embodiment, at the end of each four TAF group interval, the launch pad recalculates its bid index and compares it to the current hub goal index which it has received in the most recent TAF header. If the launch pad index is greater than the hub's goal index, indicating that the launch pad's performance in the bid process is outside the window established by the worst TAF group and the configured disparity ratio, the launch pad reduces its bidding frequency by, for example, increasing its TPG by a value, such as two. Alternately, if the launch pad determines that its bid index is lower than the hub's goal index, representing that the launch pad is doing worse than the network norm, the launch pad can choose among alternate solutions to address this inefficiency.

There are two reasons why the launch pad may be inefficient in its bidding for access to the hub. For example, it is possible that the TPG of the launch pad is too high for the number of active launch pads in the communication network. Such a condition can occur if a number of launch pads, which were previously bidding heavily, suddenly become inactive. The launch pad can detect such a condition based on a relatively high send/receive ratio coupled with poor overall bid index. Upon detecting this condition, a response to a launch pad index being below the hub's goal index is for the launch pad to increase its bidding frequency (e.g., decrease its TPG by two).

An alternate reason that a launch pad may be inefficient in its bidding for access to the hub is that it is in a highly populated TAF group. This condition can be detected by the launch pad as a poor send/receive ratio and a poor overall bid index. In this case, the solution for the launch pad to improve its bidding efficiency is to move out of this crowd. However, some control must be provided to the launch pads in this regard, because if all launch pads within the crowded group recognize this and move as a unit, the problem is simply recreated in a new TAF group.

Accordingly, exemplary embodiments are directed to using random number selection for changing from one TAF group to another in response to a detection of a crowded TAF group by a launch pad. Exemplary embodiments employ two bits of the launch pad serial number to determine if any change in a TAF group should be made. Accordingly, this will statistically cause of the launch pads in the crowd (e.g., one quarter of the launch pads in the crowd) to decrease their bidding frequency (e.g., increase their TPG by two), thereby easing the problem. As a result, highly populated TAF groups break up over time, and disperse into one or more larger TPGs.

VIII. EFFECTS OF FAIRNESS ON THROUGHPUT

Having described exemplary embodiments of the present invention, the effects of using techniques in accordance therewith to enhance overall operating efficiency of a communication network are illustrated with the exemplary graph of FIG. 9b. Those skilled in the art will appreciate that the ability of a launch pad to transfer data is tightly coupled to its launch pad bid index, the comparison of its bid index with the hub's goal index, and the location of the launch pads bid index in the range of available indices (e.g., zero to 256 in the above example).

For example, two active launch pads with a disparity ratio of 2:1 will have packet and transaction rates in approximately that same ratio. This disparity ratio is actively maintained by manipulating the idle time of successful bidders. As a result, round-trip delays (RTD) of these launch pads are also in a 2:1 ratio, launch pads with higher indices having smaller round-trip delays. Further, those skilled in the art will appreciate that the lower the launch pad bid index with respect to full scale, the worse the transaction rate and the longer the round-trip delay.

By monitoring over time, the hub can detect overall communication network performance degradation by sensing erosion of the hub goal index and use this information to adjust the number of bid slots available for launch pad bidding so that network performance is maximized. Such bid slot management is one aspect of the present invention and is described in detail below.

First note, however, that in accordance with exemplary embodiments, if the hub goal index reaches a stable operating level for a fixed disparity ratio and bid slot configuration, a stable transaction rate exists for the overall communication network. If the number of launch pads actively bidding in the system is subsequently increased, the hub goal index after some time will find a new operating point and an associated new transaction rate. In accordance with exemplary embodiments, the two transaction rates are the same. That is, by adding more launch pads to the bidding process such that the total number of launch pads increases by some ratio, the launch pad indices in the network will fall by the same ratio. Each launch pad's round-trip delay will similarly rise, and the individual transfer rate of each launch pad will correspondingly fall. However, the balance of lost individual transaction rates and the addition of launch pads causes the overall communication network transaction rate, as measured at the hub, to remain relatively constant.

Thus, once a bid slot configuration and disparity ratio have been selected, an aggregate communication network transaction rate is implicitly selected and remains relatively constant regardless of the number of launch pads active in the system. Exemplary embodiments of the present invention can achieve overall enhanced efficiency and maintain this enhanced efficiency as launch pads are added to and deleted from the communication network, as illustrated in FIG. 9b. In exemplary embodiments, a disparity ratio (usually between 2:1 and 5:1) is chosen and fixed to effect a minimum level of fairness between launch pads, while the number of available bid slots is adjusted dynamically, as described below, to maximize the overall network transaction rate for the given disparity ratio.

IX. ALTERNATE IMPLEMENTATION

In the exemplary embodiments described above, launch pads used to transfer data to a hub adjust their bidding for access to the hub using a goal index based on a short history of success or failure in launch pad bidding throughout the network. Launch pads transmit bids to the hub once every set number of TAF periods, with the number of bids representing the launch pad TPG. A bid frame sent to the hub by a given launch pad includes the number of times that the particular bid has been sent without success, and includes the TPG of the sending launch pad. The launch pad tracks the number of times required to send each bid and the number of bids sent in a given period of time (e.g., a set number of TAF groups, such as 8 TAF groups; in an exemplary embodiment wherein there a 4 TAF periods per TAF group, 8 TAF groups corresponds to 32 TAF periods). The launch pad then divides the former by the latter to arrive at a ratio of bid transmission success in that time period referred to as a send/receive ratio. A send/receive ratio of one indicates perfect reception, while a value of zero indicates a complete inability of the bid to be received in the tracked time period.

The hub, upon reception of a bid, adds the number of times required by the launch pad to send that bid to a running count for each TAF group. Upon expiration of a timing period corresponding to the given time period of the launch pad (i.e., 8 TAF groups in the above example), a send/receive ratio is calculated for each TAF group. The send/receive ratios for all TAF groups are used for selecting the value representing the group with the worst bid performance. The hub then calculates the hub index using the TPG of the worst performing group in the system, and multiplies this index by a fixed disparity ratio. The result is a final value which is then transmitted to all launch pads in the network as a hub goal index.

At the end of each time period (e.g., 8 TAF groups in the above example), each launch pad uses its current TPG value and its send/receive ratio of the previous time period to calculate its own bidding index using a formula of section VI.A. above. That is:

$$LPBidIndex = \left[ \begin{array}{c} Scale \\ Factor \end{array} \right] * \left[ \frac{Bids\ Received}{Bids\ Sent * TPG} \right]$$

This formula represents a calculation of a bid index based on TAFs per group and the send/receive ratio, in an effort to achieve an index of:

$$\left[ \frac{\begin{array}{c} Broadcast \\ Hub\ Index \end{array}}{Disparity\ Ratio} \right]$$

with the disparity ratio ranging from a maximum value down to one (e.g., 2:1). Each launch pad then compares its performance index to the goal index broadcast by the hub and adjusts its TPG accordingly. That is, if the launch pad calculated index is higher than the goal index broadcast by the hub, this indicates that the launch pad is performing at a level above the network norm, such that it will increase its TPG to worsen its performance. Similarly, launch pad indexes which are below the goal index will decrease their TPGs to improve their performance relative to the network norm.

Given this review of the implementation described above, an alternate implementation will be described whereby launch pads do not compare their calculated index to the hub calculated goal index for modifying their TPG in a trial and error process to create a send/receive ratio which moves toward the network norm. The technique described previously achieves network bid fairness by having launch pads with high success rates placed in larger TAF groups having a higher TPG than those with lower success rates. In accordance with an alternate embodiment, rather than having each launch pad determine its own TAF group, a single TAF group associated with a single bid frequency is determined for all launch pads. In accordance with an exemplary embodiment, when all launch pads operate at a common bid frequency, the fairness performance of the overall system is the same as the multiple group membership implementation.

In accordance with this alternate embodiment, a calculation of a bid index as described previously is modified such that rather than generating an index for comparison based on a launch pad's true send/receive ratio and TPG, the launch pad instead calculates its TPG based on average network performance indicated by the broadcast hub index and a target (i.e., goal) send/receive ratio. Those skilled in the art will appreciate that a target send/receive ratio of one, in this example, would be ideal. Using this value and transposing the variables of the calculation for bid index, the processor of each launch pad can perform a step of modifying its index in response to hub broadcast index. A calculation at the launch pad which involves only the hub's transmitted index value is as follows:

$$TAFs\ Per\ Group = \left[ \frac{Scaling\ Factor}{HUB\ Broadcast\ Index} \right]$$

Because the hub's transmitted index value is known by the hub, each launch pad need not perform this calculation of TAFs per group (although those skilled in the art will appreciate that this could be done, if desired). Rather, the hub uses its index value to calculate a TPG for the network, and then broadcasts this network TPG to all launch pads as the hub index. Thus, this alternate implementation involves modified operation of the launch pads and the hub.

A. OPERATION AT THE LAUNCH PAD

As each bid is transmitted from a launch pad to the hub, a byte field in the bid frame is incremented to indicate the number of times the bid has been sent to the hub without acknowledgement of reception by the hub. In accordance with exemplary embodiments, this field is not incremented beyond a set value, (e.g., a value of 8), and is reset to a preset number (e.g., reset to 0) upon receipt of a time assignment by the hub. The bid frequency (i.e., TPG) of the launch pad is broadcast from the hub in each TAF frame, such that the TPG of the launch pad need merely be read each TAF period. Since the TPG of the network is known to the hub, there is no need for the launch pad to include this information in the bid frame as was done in the embodiment described previously.

B. OPERATION AT THE HUB

In accordance with this alternate embodiment, the hub goal index is no longer used to determine a TPG for each of the bidding launch pads since, in this alternate embodiment, all launch pads have the same TPG as calculated by the hub. Thus, for the period of time over which a new TPG calculation takes place, (e.g., 8 TAF groups in the example mentioned above), an array of bytes is created, with one byte being created for each TAF period in the time period plus one byte that is not used. Each of the bytes corresponds to a number of unsuccessful bid attempts (i.e., byte 8 corresponds to a bid which was sent 8 times before acknowledgement by the hub).

Thus, in an exemplary embodiment as described above, a 9 byte array results for the exemplary 8 TAF group time period, of which byte 0 is unused. This array is cleared at the onset of the time period. When a bid is received, the number of transmit attempts before reception, as obtained from the bid frame sent to the hub by the launch pad, is used as an index into the byte array to increment the byte representing the number of transmission attempts. For example, if a bid is received by the hub, and this bid indicates that the number of transmitted attempts before its reception by the hub was 2, then byte 2 of the array is incremented. This process continues for the duration of the set time period.

At the end of each time period (e.g., 8 TAF groups in the above example), the hub evaluates the distribution of counts in the byte array. If all bids were received after only one transmit (i.e., the count in byte 1 of the array is non-zero, while the remaining seven relevant counts are zero), then the bid disparity ratio of all launch pads in the network is 1:1. Similarly, if the counts in bytes 1 and 2 are non-zero, while the remaining six relevant bytes are zero, then the disparity ratio of the system is 2:1. The hub will increase or decrease its bid index to include all bid transmit counts in the first N bytes of array, wherein N is a fixed disparity ratio.

At initialization, the hub resets its bid index to full scale (e.g., 256), and initiates the first time period over which bid success is to be monitored (e.g, a time period of 8 TAF groups in the above example). At the end of each such time period, the hub will either increase or decrease its index by a fixed amount (e.g., a fixed step size such as 4), using the following criteria:

(1) if byte 8 in the above example is non-zero, the bid index is decremented, with such a transmit count indicating that at least one launch pad is having severe difficulty in transmitting bids to the hub;

(2) beginning with byte 7 of the array and working back toward byte 1, the hub determines the first transmit count which is greater than a set number (e.g., 1); counts below the set number (e.g., counts of 1 in the above example) are disregarded based on the assumption that the random nature of bid slot selection and TAF selection in the current group will generate sporadic and insignificant bid transmit counts of an atypical nature;

(3) if the first transmit count greater than the set number (e.g., 1 in the above example) corresponds to a byte number greater than or equal to (N+2), wherein N is the disparity ratio, the bid index is decremented by the fixed step size; If the first transmit count greater than 1 is in a byte numbered less than (N+2), the index is incremented. Once calculated the new hub index is divided into the scaling factor to determine a new TPG. The new TPG is then broadcast to all launch pads in the TAF frames of the upcoming time period.

FIG. 10 illustrates an exemplary distribution curve which provides the basis for incrementing or decrementing the index for the purpose of maintaining the count distribution in the first (N+1) bytes of the array. By preventing significant counts from occurring in byte (N+2), a significant, but small count in byte (N+1) is implied, with a vast majority of the counts contained within bytes numbered less than or equal to N. Consequently, when averaged over a period of time, the network disparity ratio averages out to N, and the random selection of slots and TAF period (within the TPG) in accordance with exemplary embodiments ensure that no single launch pad becomes a permanent resident of byte count (N+1). In accordance with this alternate exemplary embodiment, to further prevent any single launch pad from becoming a permanent resident of byte count (N+1), any or all of the launch pads can also be provided with a "panic button".

More particularly, the use of a launch pad "panic button" is as follows. If a transmit count of a bid frame at a launch pad reaches a set value (e.g., 8 in the above example), indicating that all attempts to transmit in a single time period (for example, 8 TAF groups in the above example) were unsuccessful, a launch pad can, in accordance with exemplary embodiments, take unilateral action by increasing its bid frequency (i.e., lowering its TPG) for that single bid. Since all other launch pads in the network are operating at a single TPG value, the operation of a single launch pad at an elevated bid frequency will virtually ensure that either its bid will be heard, or the collision rate of the network will increase significantly. In the first case, the hub will receive a bid frame with a transmit count of eight, which guarantees a decrement of the hub index. In the second case, the entire distribution curve of FIG. 10 will skew to the right, and similarly cause a decrease of the hub index. Consequently, the result of either case is a worsening of the index, which eventually increases the network TPG and resolves the problem.

X. BID SLOT MANAGEMENT

In accordance with exemplary embodiments of the present invention as described above, the hub processor can be configured as a means for measuring an ability of a group of secondary devices, such as the launch pads, to communicate with a first device, such as the hub. Further, the hub processor can be configured as a means for adjusting a number of time periods during which the secondary devices can request access to the first device in response to the measured ability of a group of secondary devices to communicate with the first device.

In accordance with an exemplary embodiment, the number of bid slots is managed (i.e., altered) while the disparity ratio is held constant. Although a bid slot management technique in accordance with the present invention can be used with any of the exemplary embodiments described above, the following discussion will focus on an embodiment having multiple TAF groups (i.e., launch pads are in one of multiple groups, each group having a different TPG). However, those skilled in the art will appreciate that the bid slot management techniques can be used for the alternate embodiment described as using a single TPG for all launch pads.

Referring to FIG. 11a, it is clear that at very low network loads (i.e., small numbers of active launch pads) the bid index for the various TAF groups calculated at the hub are all quite close to the ideal full scale value (255 in the exemplary embodiments). The line "a" of FIG. 11a represents this condition by indicating a very slight differential between the worst TAF group index and full scale. When this worst TAF group index is multiplied by the configured disparity ratio (e.g., 2:1), the resulting value is much greater than the full scale value, and the value broadcast as the hub goal index is clamped at full scale.

As the number of active launch pads in the network increases, bid competition also increases and the bid index of the worst TAF group begins to fall significantly away from the full scale value. This gives rise to a larger differential between the worst TAF group index and the broadcast hub goal index, as shown by line "b" of FIG. 11a. Eventually, bid collisions increase in number and the bidding process deteriorates until line "c" of FIG. 11a is reached. There the bid index of the worst TAF group is equal to the full scale value divided by the disparity ratio (i.e., 2:1 in the example of FIG. 11a).

As bidding activity continues to increase, the bid index of the worst TAF group drops below the full scale value divided by the disparity ratio, and therefore the broadcast hub goal index drops for the first time below full scale. The hub goal index has in effect been torn free of the upper index "rail" representing full scale, as depicted in FIG. 11b. Thus, a bid index of the worst TAF group which, when multiplied by the disparity ratio yields a broadcast hub goal index just less than full scale, is referred to as the "breakaway" index value.

As the bid index of the worst TAF group multiplied by the disparity ratio approaches a breaks away from full scale (i.e., the bid index approaches the breakaway value), the transactions per second rate of the overall network, as measured at the hub, increases. This increase is approximately linear, with the rate of increase in transactions per second remaining relatively constant with respect to the degrading worst TAF group index. However, as was pointed out in FIG. 9b above, the transactions per second rate eventually levels off to a constant value, with further index degradation resulting only in increased round trip delay. FIG. 12 depicts this behavior in greater detail and shows that the approximately linear behavior ends, and the leveling off process begins, at the breakaway index value.

As the leveling off effect becomes more pronounced with increasing deterioration of the bid process, a point is reached where the transactions per second rate is virtually flat. The plateau index value of the worst TAF group bid index can be defined as that value occurring at the point where the transactions per second rate can be considered flat. FIG. 12 shows a table of "rule of thumb" plateau values for three integer disparity ratios (note that the values shown in FIG. 12 assume an exemplary 104 bytes per user data packet transferred). The plateau values of FIG. 12 are seen to be the breakaway values for each integer disparity ratio, lessened by a significant percentage. Simplification of a true transaction per second behavior curve can be achieved, at the cost of some accuracy, if the curve is approximated by two straight line segments, as indicated by the dotted lines in FIG. 12, To facilitate discussion, the discontinuity at the joining of the two line segments can fairly be assumed to occur at the breakaway index value. However, this is in reality an approximation only, and the discontinuity can actually span a small range of values.

FIG. 13 depicts a simplified piece-wise linear approximation of transactions per second versus worst TAF group bid index, as was described with respect to FIG. 12, for configurations of two, four, and eight bid slots per TAF period. As described above, the linear increase in transactions per second rate rate breaks in each case to a constant value at the breakaway index value. Increasing network load after the breakaway point causes the bid process to continue to degrade, and indices to continue to fall, with no gain in overall system throughput. In other words, beyond the breakaway point, increasing imposed round trip delay merely "backlogs" potential transactions.

FIG. 13 shows that while increasing the number of bid slots from two to four would result in a decrease of overall transactions per second rate prior to the breakaway index value on the two-slot curve, a point is reached where the two and four bid slot approximations cross. At that point, the increase in network traffic that would be realized by switching to four bid slots and thus "unblocking" the potential transactions that are being held back by the imposed round trip delay equals the amount of overhead that would be added to the system by the addition of two more bid slots per TAF period. Therefore, it is advantageous to switch to four bid slots at the cross-over point in the presence of continued deterioration of the worst TAF group index. Such a switch results in a better network transactions per second rate, higher bid indices, and lowered round trip delay. An analogous cross-over, or switch, point also occurs between the four-slot and eight-slot curves. The switch points for increasing the number of bid slots are independent of the disparity ratio.

A precise method for computing the worst TAF group bid index at the cross-over points between bid slot curves is difficult to determine. The switch point values depend not only on the length of the bid slots, but also on the network error rate, the host packet processing time, and the packet size of launch pad generated transactions. Accordingly, reasonable "rule of thumb" approximations can be used to determine the bid slot switch points in accordance with exemplary embodiments of the present invention, and these switch points can be verified empirically if desired. Switch points that have been empirically proven to be good first-order approximations for the exemplary embodiments described above are summarized in the chart of FIG. 13. FIG. 13 shows an exemplary illustration wherein as the worst TAF group index reaches the plateau value of the two bid slot curve and then degrades to the switch point value A representing an exemplary value of 80 relative to the exemplary full scale value of 255, increasing the number of bid slots causes an index rebound B to an exemplary value of 115 on the four slot curve. Maintaining four slots until the second switch point C having an exemplary value of 56 causes a similar index rebound D to an exemplary value of 90 when transition is made to eight slots.

In accordance with exemplary embodiments, the switch point values can be fine tuned dynamically while the system is in operation. Such dynamic computation of switch values can readily be implemented more efficiently as available processing components increase in speed and decrease in size.

The default switch points given in FIG. 13 have proven to be very good first-order approximations to the true cross-over values, independent of disparity ratio. Also, these values are independent of the packet size of the transactions, as long as the data packets are large relative to the size of the bid slots (e.g., 40 user bytes per data packet in exemplary embodiments). The defaults of FIG. 13 also work at smaller packet sizes, although the switch points may be set somewhat lower to realize slightly better network efficiency. Of course, any number of bid slots and/or any number of switch points can be used, with the foregoing illustration being by way of example only. It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced therein.

What is claimed is:

1. A method for arbitrating communication between a first device and a plurality of secondary devices, comprising the steps of:

establishing a time assignment frame period as a basic unit of communication between said first device and said plurality of secondary devices;

establishing an index representing an ability of a group of said secondary devices to communicate with said first device;

adjusting a number of time slots within said time assignment frame period in response to said index, each of said time slots providing a period of time during which said secondary devices can request access to said first device;

monitoring a frequency of bidding of said group of secondary devices; and setting a value of said index in response to said monitored frequency of bidding.

2. A method for arbitrating communication between a first device and a plurality of secondary devices, comprising the steps of:

establishing a time assignment frame period as a basic unit of communication between said first device and said plurality of secondary devices;

establishing an index representing an ability of a group of said secondary devices to communicate with said first device; and adjusting a number of time slots within said time assignment frame period in response to said index, each of said time slots providing a period of time during which said secondary devices can request access to said first device, wherein said step of establishing an index further includes the steps of:

monitoring a bid send-to-receive ratio of said group of secondary devices; and setting a value of said index in response to said monitored send-to-receive ratio.

3. The method of claim 2, wherein said step of establishing an index further includes the steps of:

monitoring a frequency of bidding of said group of secondary devices; and setting a value of said index in response to said monitored frequency of bidding.

4. A method for arbitrating communication between a first device and a plurality of secondary devices, comprising the steps of:

establishing a time assignment frame period as a basic unit of communication between said first device and said plurality of secondary devices;

establishing an index representing an ability of a group of said secondary_ devices to communicate with said first device; and adjusting a number of time slots within said time assignment frame period in response to said index, each of said time slots providing a period of time during which said secondary devices can request access to said first device, wherein said step of establishing an index further includes the steps of:

establishing a plurality of group indices, each group index representing an ability of a corresponding group of said secondary devices to communicate with said first device; and setting said index equal to a worst one of said group indices, said worst group index corresponding to a group of said secondary devices which is least successful in bidding for access to said first device.

5. The method of claim 1, wherein said step of adjusting a number of time slots further includes the steps of:

comparing said index to at least one switch point value; and setting said number of time slots in response to said step of comparing.

6. The method of claim 5, wherein said switch points are predetermined based on an empirical evaluation of a given network configuration.

7. The method of claim 1, wherein said number of time slots is adjusted to maximize an overall efficiency of communication between said first device and said plurality of secondary devices.

8. The method of claim 7, wherein said efficiency of communication is measured in terms of an overall number of transactions-per-second between said first device and said plurality of secondary devices.

9. The method of claim 4, wherein said step of establishing an index further includes the steps of:

monitoring a frequency of bidding of said group of secondary devices; and setting a value of said index in response to said monitored frequency of bidding.

10. The method of claim 2, wherein said step of adjusting a number of time slots further includes the steps of:

comparing said index to at least one switch point value; and setting said number of time slots in response to said step of comparing.

11. The method of claim 10, wherein said switch points are predetermined based on an empirical evaluation of a given network configuration.

12. The method of claim 2, wherein said number of time slots is adjusted to maximize an overall efficiency of communication between said first device and said plurality of secondary devices.

13. The method of claim 12, wherein said efficiency of communication is measured in terms of an overall number of transactions-per-second between said first device and said plurality of secondary devices.

14. The method of claim 4, wherein said step of adjusting a number of time slots further includes the steps of:

comparing said index to at least one switch point value; and setting said number of time slots in response to said step of comparing.

15. The method of claim 14, wherein said switch points are predetermined based on an empirical evaluation of a given network configuration.

16. The method of claim 4, wherein said number of time slots is adjusted to maximize an overall efficiency of communication between said first device and said plurality of secondary devices.

17. The method of claim 16, wherein said efficiency of communication is measured in terms of an overall number of transactions-per-second between said first device and said plurality of secondary devices.

* * * * *